(12) United States Patent
Moed et al.

(10) Patent No.: US 8,570,393 B2
(45) Date of Patent: Oct. 29, 2013

(54) SYSTEM AND METHOD FOR PROCESSING IMAGE DATA RELATIVE TO A FOCUS OF ATTENTION WITHIN THE OVERALL IMAGE

(75) Inventors: Michael C. Moed, Hopkinton, MA (US); E. John McGarry, La Jolla, CA (US)

(73) Assignee: Cognex Corporation, Natick, MA (US)

( * ) Notice: Subject to any disclaimer, the term of this patent is extended or adjusted under 35 U.S.C. 154(b) by 142 days.

(21) Appl. No.: 12/781,651

(22) Filed: May 17, 2010

(65) Prior Publication Data

US 2011/0211726 A1    Sep. 1, 2011

Related U.S. Application Data

(63) Continuation-in-part of application No. 12/184,187, filed on Jul. 31, 2008.

(60) Provisional application No. 60/991,545, filed on Nov. 30, 2007.

(51) Int. Cl.
*H04N 5/225* (2006.01)

(52) U.S. Cl.
USPC ........................................ 348/222.1; 348/294

(58) Field of Classification Search
USPC ............... 348/222.1, 231.99–231.6, 294, 308
See application file for complete search history.

(56) References Cited

U.S. PATENT DOCUMENTS

| | | | |
|---|---|---|---|
| 5,253,308 A | 10/1993 | Johnson | |
| 5,495,537 A | 2/1996 | Bedrosian et al. | |

(Continued)

FOREIGN PATENT DOCUMENTS

| | | |
|---|---|---|
| EP | 1580814 | 9/2005 |
| GB | 2 421 137 | 6/2006 |

(Continued)

OTHER PUBLICATIONS

Broggi, et al., "Enhancement of a 2D Array Processor for an Efficient Implementation of Visual Perception Tasks", "Proc. Computer Architectures for Machine Perception", Dec. 15, 1993, pp. 172-178, Publisher: IEEE, Published in: IT.

(Continued)

*Primary Examiner* — Tuan Ho
(74) *Attorney, Agent, or Firm* — Loginov & Associates, PLLC

(57) ABSTRACT

This invention provides a system and method for processing discrete image data within an overall set of acquired image data based upon a focus of attention within that image. The result of such processing is to operate upon a more limited subset of the overall image data to generate output values required by the vision system process. Such output value can be a decoded ID or other alphanumeric data. The system and method is performed in a vision system having two processor groups, along with a data memory that is smaller in capacity than the amount of image data to be read out from the sensor array. The first processor group is a plurality of SIMD processors and at least one general purpose processor, co-located on the same die with the data memory. A data reduction function operates within the same clock cycle as data-readout from the sensor to generate a reduced data set that is stored in the on-die data memory. At least a portion of the overall, unreduced image data is concurrently (in the same clock cycle) transferred to the second processor while the first processor transmits at least one region indicator with respect to the reduced data set to the second processor. The region indicator represents at least one focus of attention for the second processor to operate upon.

21 Claims, 13 Drawing Sheets

(56) References Cited

U.S. PATENT DOCUMENTS

| | | | |
|---|---|---|---|
| 5,524,068 A | 6/1996 | Kacandes et al. | |
| 5,588,435 A | 12/1996 | Weng et al. | |
| 5,692,210 A | 11/1997 | Mita et al. | |
| 5,698,833 A | 12/1997 | Skinger | |
| 5,835,141 A | 11/1998 | Ackland et al. | |
| 5,936,224 A | 8/1999 | Shimizu et al. | |
| 6,233,368 B1 | 5/2001 | Badyal et al. | |
| 6,240,208 B1 | 5/2001 | Garakani et al. | |
| 6,317,819 B1 | 11/2001 | Morton | |
| 6,411,734 B1 | 6/2002 | Bachelder et al. | |
| 6,585,159 B1 | 7/2003 | Meier et al. | |
| 6,617,565 B2 | 9/2003 | Wu | |
| 6,701,005 B1 | 3/2004 | Nichani | |
| 6,898,333 B1 | 5/2005 | Gopalakrishnan et al. | |
| 6,948,050 B1 | 9/2005 | Gove et al. | |
| 7,016,539 B1 | 3/2006 | Silver et al. | |
| 7,050,631 B2 | 5/2006 | Bian et al. | |
| 7,077,322 B2 | 7/2006 | Miyazawa et al. | |
| 7,085,432 B2 | 8/2006 | Paquette | |
| 7,088,845 B2 | 8/2006 | Gu et al. | |
| 7,205,522 B2 | 4/2007 | Krymski | |
| 7,209,173 B2 | 4/2007 | Fossum | |
| 7,237,721 B2 | 7/2007 | Bilcu et al. | |
| 7,271,835 B2 | 9/2007 | Lizuka et al. | |
| 7,319,423 B2 | 1/2008 | Augusto et al. | |
| 7,455,231 B2 | 11/2008 | He | |
| 7,519,239 B2 | 4/2009 | Hepworth et al. | |
| 7,637,430 B2 | 12/2009 | Hawley | |
| 2001/0006191 A1 | 7/2001 | Hecht et al. | |
| 2002/0021835 A1 | 2/2002 | Andreasson et al. | |
| 2002/0084330 A1 | 7/2002 | Chiu | |
| 2003/0085336 A1 | 5/2003 | Wu | |
| 2004/0103093 A1 | 5/2004 | Furuhashi et al. | |
| 2004/0119844 A1* | 6/2004 | Aldrich et al. | 348/231.99 |
| 2005/0041128 A1 | 2/2005 | Baker | |
| 2006/0012697 A1 | 1/2006 | Boemler | |
| 2006/0186322 A1 | 8/2006 | Matsuyama | |
| 2007/0046799 A1 | 3/2007 | Moholt | |
| 2007/0076109 A1 | 4/2007 | Krymski | |
| 2007/0258007 A1 | 11/2007 | Justiss et al. | |
| 2007/0273785 A1 | 11/2007 | Ogawa et al. | |
| 2007/0285526 A1 | 12/2007 | Mann et al. | |
| 2008/0012696 A1 | 1/2008 | Segura Gordillo et al. | |
| 2008/0012969 A1 | 1/2008 | Kasai et al. | |
| 2008/0240571 A1 | 10/2008 | Tian et al. | |
| 2009/0022429 A1 | 1/2009 | Longacre, Jr. et al. | |
| 2009/0046953 A1 | 2/2009 | Bink et al. | |
| 2009/0052780 A1 | 2/2009 | Kwon et al. | |
| 2009/0072120 A1 | 3/2009 | McGarry et al. | |
| 2009/0141987 A1 | 6/2009 | McGarry et al. | |
| 2009/0202149 A1 | 8/2009 | Doi et al. | |
| 2009/0212112 A1 | 8/2009 | Li et al. | |
| 2009/0238478 A1 | 9/2009 | Banno | |
| 2010/0037024 A1 | 2/2010 | Brewer et al. | |
| 2010/0118161 A1* | 5/2010 | Tsurumi | 348/231.3 |
| 2011/0211726 A1 | 9/2011 | Moed et al. | |

FOREIGN PATENT DOCUMENTS

| | | |
|---|---|---|
| JP | 2003023573 | 1/2003 |
| JP | 2005286799 | 10/2005 |
| WO | WO 2005106786 A1 | 11/2005 |
| WO | WO 2007/116352 A2 | 10/2007 |

OTHER PUBLICATIONS

Broggi, et al., "The Paprica Massively Parallel Processor", "First International Conference on", May 2, 1994, pp. 16-30, Publisher: IEEE, Published in: US.

Gregoretti, et al., "The Paprica SIMD Array: Critical Reviews and Perspectives", "International Conference on", Oct. 25, 1993, pp. 309-319, Publisher: IEEE, Published in: IT.

Forchheimer, R. et al., "Single-Chip Image Sensors with a Digital Processor Array", Journal of VLSI Signal Processing, 5, Kluwer Academic publishers, Boston, (1993),pp. 121-131.

"PCT/US11/036458" the International Search Report and Written Opinion of the International Searching Authority, (Oct. 19, 2011).

Rhee, et al., "Boundary Extraction of Moving Objects From Image Sequence", "1999 IEEE TENCON", 1999, pp. 621-624, Publisher: IEEE.

Iannizzotto, et al., "An Edge-Based Segmentation Technique for 2D Still-Image With Cellular Neural Networks", "IEEE Xplore", 2005, pp. 211-218, vol. 1, Publisher: IEEE.

Rehse, "Edge Information: A Confidence Based Algorithm Emphasizing Continuous Curves", , pp. 851-856.

Miyazaki, "Image Processing System Having Extended Area of Interest Circuitry", "IBM Technical Disclosure Bulletin", Mar. 1993, pp. 447-450, Publisher: IBM.

Sappa, et al., "Improving a Genetic Algorithm Segmentation by Means of a Fast Edge Detection Technique", "IEEE Xplore", pp. 754-757.

Karande, et al., "Independent Component Analysis of Edge Information for Face Recognition", "International Journal of Image Processing", pp. 120-130, vol. 3, No. 3.

Chintalapudi, "Localized Edge Detection in Sensor Fields", Publisher: University of Southern California.

Rosas, et al., "SIMD Architecture for Image Segmentation Using Sobel Operators Implemented in FPGA Technology", "2nd International Conference on Electrical and Electronics Engineering", Sep. 7, 2009, pp. 77-80, Publisher: IEEE.

Cat, et al., "SIMPiL: An OE Integrated SIMD Architecture for Focal Plane Processing Applications", "IEEE Xplore", 1996, pp. 44-52, Publisher: IEEE.

Van Der Wal, et al., ""The Acadia Vision Processor"", *Computer Architectures for Machine Perception*, Sep. 11, 2000, pp. 31-40, Publisher: IEEE Comput. Soc.

Kyo, et al., ""An Integrated Memory Array Processor Architecture for Embedded Image Recognition Systems"", *Computer Architecture*, Jun. 4, 2005, pp. 134-145, Publisher: IEEE.

Li, et al., ""A Window-Based Bar Code Acquisition System"", *Document Recognition*, Feb. 9, 2004, pp. 125-132, vol. 2181, Publisher: SPIE, Published in: US.

Watanabe, "955-fps Real-time Shape Measurement of a Moving/Deforming Object using High-Speed Vision for Numerous-point Analysis", *2007 IEEE International Conference on Robotics and Automation*, Roma, Italy, (2007).

Ishikawa Oku Laboratory, "Highspeed Vision with Massively Parallel Copressors", *Parallel Processing for Sensory Information—2001-2006 IEEE*, (2001).

Ishikawa Oku Laboratory, "Image-Moment Sensor", *Parallel Processing for Sensory Information*, Ishikawa Oku Laboratory, Department of Information Physics and Computing., (2008).

Ishikawa Oku Laboratory, "Processor for High-speed Moment-based Analysis of Numerous Objects", *Parallel Processing for Sensory Information, 2001-2006 IEEE*, Ishikawa Oku Laboratory, Department of Information Physics and Computing, (2001).

Ishikawa Oku Laboratory, "Real-time Shape Measurement of Moving/Deforming Object", *Parallel Processing for Sensory Information, 2001-2006 IEEE*, Ishikawa Oku Laboratory, Department of Information Physics and Computing, (2001).

Ishikawa Oku Laboratory, "Vision Chip", *Parallel Processing for Sensory Information*, Ishikawa Oku Laboratory, Department of Information Physics and Computing, (2008).

Forchheimer, "Single-Chip Image Sensors with a Digital Processor Array", *Journal of VSLI Signal Processing*, 5, 121-131 (1993).

* cited by examiner

R = X*K00 + Y*K01 + DR

C = X*K10 + Y*K11 + DC

710

SYSTEM AND METHOD FOR PROCESSING IMAGE DATA RELATIVE TO A FOCUS OF ATTENTION WITHIN THE OVERALL IMAGE

RELATED APPLICATIONS

This application is a continuation-in-part of copending U.S. application Ser. No. 12/184,187, filed Jul. 31, 2008, entitled VISION SENSORS, SYSTEMS, AND METHODS, the entire disclosure of which is expressly herein incorporated by reference, which claims the benefit of U.S. Provisional Application Ser. No. 60/991,545, filed Nov. 30, 2007, entitled VISION SYSTEM ON A CHIP, the entire disclosure of which is expressly herein incorporated by reference.

FIELD OF THE INVENTION

This invention relates to machine vision systems and more particularly to processing of image data by a vision system processing arrangement.

BACKGROUND OF THE INVENTION

Machine vision systems use image acquisition devices that include camera sensors to deliver information related to a viewed object/surface. The system then interprets this information according to a variety of algorithms to perform a programmed decision-making, alignment, and/or identification function.

By way of background, FIG. 1 shows an exemplary vision system 110 that includes an optical camera lens 120 and associated one-dimensional (1D) or two-dimensional (2D) image sensor pixel array 121. These components 120, 121 are arranged to acquire an image in the form of matrix of pixel data. The field of view 122 defines the boundaries 126 of the acquired image, which in this example, contains an object or surface 124 with features that the system 110 desires to analyze. The field of view 122 can extend beyond the object 124 as shown by the associated boundaries. The acquired image data 140, in the form of color pixels or grayscale pixel intensity values is processed by an image processor 130, and transferred to another device, (not shown). One example of a connected device is a digital signal processor (DSP) that is adapted to decode symbology. The image processor can include hardware functions and/or program instructions that perform a variety of processing tasks. For example, the image processor can perform feature detection using, for example, blob analysis, edge detection and other conventional vision system operations. The features can be further processed by the image processor 130 to provide, for example, pose and alignment data, inspection results, object recognition results or other useful image data. The results can be used internally to provide alarms and signals, or can be transferred to another device or system. For example, ID features from a barcode acquired by the system 110 can be transferred to a dedicated digital signal processor (DSP) to decode the features into an alphanumeric character string using conventional decoding functions.

The pixel data acquired from an entire field of view 122 can be relatively large from a processing overhead standpoint. In general, this pixel data is read-out from the sensor to a data memory associated with the processor, which then performs image processing functions on the image data. Where the processor is a graphics processing unit (GPU) or a digital signal processor DSP, it is typically required to sort through an entire set of image data from a captured image in order to derive the desired result(s). This typically requires the device to handle a very large quantity of data, and thus can invoke significant processing overhead. Generally, the device (GPU, DSP, etc.) may have a relatively small, directly accessible cache memory requiring that image data be moved out of the cache relative to a larger off-die random access memory (RAM). This movement of data is expensive in terms of processing overhead. These various issues lead to a scenario in which the DSP may be too overloaded with image data to meet required throughput rates and other system parameters.

Notably, the imaged object or surface 124 typically represents a smaller amount of image data than that contained within the image of the overall field of view 122. Within the smaller image data of the object/surface 124, the features of interest 150 (e.g. a barcode, part, bolt hole, etc.) can be an even smaller subset of the overall image data. Thus, the actual image data that is useful for further processing by the DSP or other processing device may in fact be a much smaller subset of the overall image data.

It is, therefore, desirable to provide a system and method that identifies useful image data within an acquired set of overall image data, so that this data can be processed more quickly and efficiently by the processors employed in the vision system.

SUMMARY OF THE INVENTION

This invention overcomes disadvantages of the prior art by providing a system and method for processing discrete image data within an overall set of acquired image data based upon a focus of attention within that image. The result of such processing is to operate upon a more limited subset of the overall image data to generate an output value required by the vision system process. Such output value can be a decoded ID or other alphanumeric data. The system and method is performed in a vision system having two processor groups, along with a data memory associated with the first processor group that is smaller in capacity than the amount of image data to be read out from the sensor array. This data memory can comprise a random access memory (RAM) that is directly accessible by the first processor group in a manner that renders memory-access operations relatively inexpensive from a latency overhead standpoint. To increase efficiency, the first processor group, typically a plurality of SIMD processors and at least one general purpose processor (CPU) that are co-located on the same die with the data memory, employs a data reduction function operating concurrently within the same processing cycle as data-readout from the sensor to generate a reduced data set that is stored in the on-die data memory. In an embodiment, at least a portion of the overall, unreduced image data is concurrently (in the same processing cycle) transferred to a second processor group (alternately defined as "a second processor") as data read-out from the sensor. Note that a processing cycle can sometimes be referred to alternately as a "clock cycle" where appropriate. In addition, the first processor group transmits at least one region indicator with respect to the reduced data set to the second processor after the region indicator is created. The region indicator represents at least one focus of attention for the second processor to operate upon. The region indicator can include other data related to the image, such as preprocessed edge data, confidence values and other data that aids the second processor in its task. More generally, a "region indicator" or "region ID" can be any reduced data value or reduced data set that allows the second processor to perform an image processing function on a portion of the image data that is a subset of the overall read-out image data. The second processor processes the unreduced image data set using an image analysis function based upon the indicated region and thereby generates one or more output values that comprise information about the image (e.g. an alphanumeric code, a good/defective signal, an alignment value, etc.). Data is transferred from the first processor group to the second processor using a variety of mechanisms and processes according to various embodiments, including, but not limited to, shift registers and direct memory access (DMA) arrangements.

In another embodiment, the reduced data set is created by the first processor group, and when a focus of attention is located in the reduced data set, a data selection function transfers a reduced data set representing the region to the second processor. This reduced data set can include image data and/or other relevant information that is useful for the second processor to perform its task. The further information can be preprocessed feature information, edge location data, confidence values, etc. Output values are then generated by the second processor, if possible, based upon the received reduced data set.

In an embodiment, the second processor is a symbology (ID) decoder that decodes 1D and/or 2D barcodes to generate an alphanumeric output value representing the barcode. The first processor determines the region or regions in the image containing at least barcode-like features and provides them to the second processor along with other data, such as the region ID. As described above, the second processor in this embodiment can comprise an off-die DSP employing conventional barcode-decoding functions.

In an embodiment, the first processor group performs a fixture or alignment operation, and the second processor receives the fixture data to perform measurement, gauging or inspection operation on the image of the object/surface. The first processor group transmits a region ID relative to where the pattern was located on the image data. The first processor group includes a pattern-finding process (e.g. conventional blob analysis, edge detection, geometric pattern-matching, etc.) to allow determination of what location(s) in the image has/have the pattern. All or part of the image is transferred to the second processor along with any useful preprocess information. This information is used to perform inspection, which can include determination of size, rotation, skew, the presence/absence of a defect, etc. relative to the object/surface. With knowledge of the pattern locations (i.e. the focuses of attention for processing), the second processor can omit operations on locations in the overall image not containing a region with a pattern.

In another embodiment, the system and method is employed for coarse alignment/fine alignment tasks. A coarse alignment is performed by the alignment process in the first processor group, in which rough accuracy is employed using one or more patterns to identify the position of one or more objects and/or surface features in the image. This rough accuracy can be at the pixel or approximately ½ pixel level in an exemplary implementation. This coarse alignment step saves processing time and data storage overhead normally associated with a single-step fine-alignment process. The coarse alignment process thereby provides data for the approximate (coarse) position of the identified pattern of object(s) or feature(s) in the in the acquired image so as to identify the location of the respective object(s) or feature(s) in the image. The data relevant to located the coarse-alignment position, and associated data (and feature information usable in other processes), is forwarded to the off-die second processor. Image data can also be provided concurrently to the second processor as it is read-out from the sensor. The second processor uses the data to perform a fine alignment process on the overall image data, which is advantageously focused upon the regions of the image that have been coarsely aligned. In general a region of interest can be drawn around these regions (for example a boundary of one to a few pixels), and the fine alignment process uses one or more patterns to operate on each region to derive a highly accurate (for example, one-tenth of a pixel and one-tenth of a degree of rotation, or finer) alignment value. The ability to concentrate fine alignment on the regions of the overall image that contain one or more coarsely aligned objects or features allows the fine alignment process to occur more quickly and efficiently than if the entire image was finely aligned in one process step. The output value in this embodiment is finely accurate location of the position of the object(s) or feature(s) in multiple degrees of freedom.

In another embodiment, the system and method is employed for coarse/fine inspection of an object or surface. A less-precise inspection process is employed on the first processor group to quickly identify candidate results, which may include various false-positive identifications, as well as valid inspection results. The rapidity in which the first processor group can generate such results counterbalances the potential presence of false positives. The locations and other data for feature candidates are transferred to the second processor, which includes a more-accurate inspection process (based, for example, on synthetic or actual trained image data). The inspection process focuses attention upon the candidates rather than the entire image, thereby reducing latency overhead. The output value is the inspection result (e.g. part passed, part defective, part-in/out-of-tolerance).

In another embodiment, the system can be implemented to characterize the motion of moving objects or a moving surface. Region IDs and features are generated by the first processor group from a stream of images that are acquired from a moving object or surface, containing location of one or more features and a timestamp for each image. These region IDs are stored in on-die data memory and transmitted to the second processor. The second processor correlates the locations of the features in each of the images, and relative time between images to determine speed, motion and/or registration of the object or surface. This information can be used by the second processor, the first processor group, or another processor, to cause an event to occur, such as indexing of a counter, variation of a speed control, operation of a cutter at a specified time, or any other activity that should occur when a predetermined amount of motion has occurred.

In yet another embodiment, the system and method employs an additional memory that is arranged to receive image data (a) either directly from the sensor, concurrently with readout of image data to the first processor group and on-die data memory, or (b) through the first processor group via an appropriate data link or bus. The additional memory (a RAM, for example) stores the image data in known addresses. The first processor group generates a reduced data set that can be region IDs in the form of addresses for portions/blocks of image data in the additional memory that represent regions of data upon which the second processor should direct (focus) its vision system processing tasks. The addressed blocks or regions of image data are transferred to the second processor from the additional memory. The second processor generates output values based upon the desired vision system task.

BRIEF DESCRIPTION OF THE DRAWINGS

The invention description below refers to the accompanying drawings, of which.

DETAILED DESCRIPTION

The illustrative system and method for processing discrete image data within an overall set of acquired image data, based upon a focus of attention, is adapted to operate with a vision system processor that defines an architecture capable of processing an entire row of data read-out from an interconnected pixel array in a discrete processing cycle (i.e. all data in a row being simultaneously processed with each clock cycle). To accomplish this, the overall processor is organized to include a wide on-bit data bus (for example a 1024×1 bus) between an image data storage memory (also having a storage array that is 1024 wide, and also termed herein a "data memory") and the pixel array (in this example, a 1024×768 pixel array with 8-bit or 6-bit pixels). This memory is interconnected by another similarly wide (1024×1, for example) bus to the image processing component, which is organized to process the entire row simultaneously using, for example, single-instruction, multiple-data (SIMD) processors that are very efficient at neighborhood operations. Accordingly, each of the processors can interoperate with others that are processing neighboring data within a row. Combined, these processors are termed the Linear Array Processor (LAP). In an illustrative embodiment these processors each operate at 90 MHz. They are configured to act as one-bit arithmetic logic units (ALUs) on the entire row of data (1024 elements) simultaneously. In the illustrative embodiment, the processors in the LAP are further adapted to allow data to be moved between processors up to 13 columns away to facilitate wide and efficient neighborhood operations. The illustrative processing rate yields a throughput of approximately 11,520 Mbytes/second for the LAP. A version of the processor architecture is shown and described in commonly assigned U.S. patent application Ser. No. 12/184,187, entitled VISION SENSORS, SYSTEMS AND METHODS, by E. John McGarry, et al., the teachings of which are incorporated by reference as useful background information, and also described in pertinent part below. More generally, the system and method herein can be adapted to operate on a variety of commercially available vision acquisition and processing systems. For example, an early version of a single-chip image sensor is described in the publication *Single-Chip Image Sensors With a Digital Processor Array*, by Robert Forchheimer, et al., Journal of VLSI Signal Processing, 5, 121-131 (1993).

I. Vision System on Chip (VSoC) Overview

Figure 1:
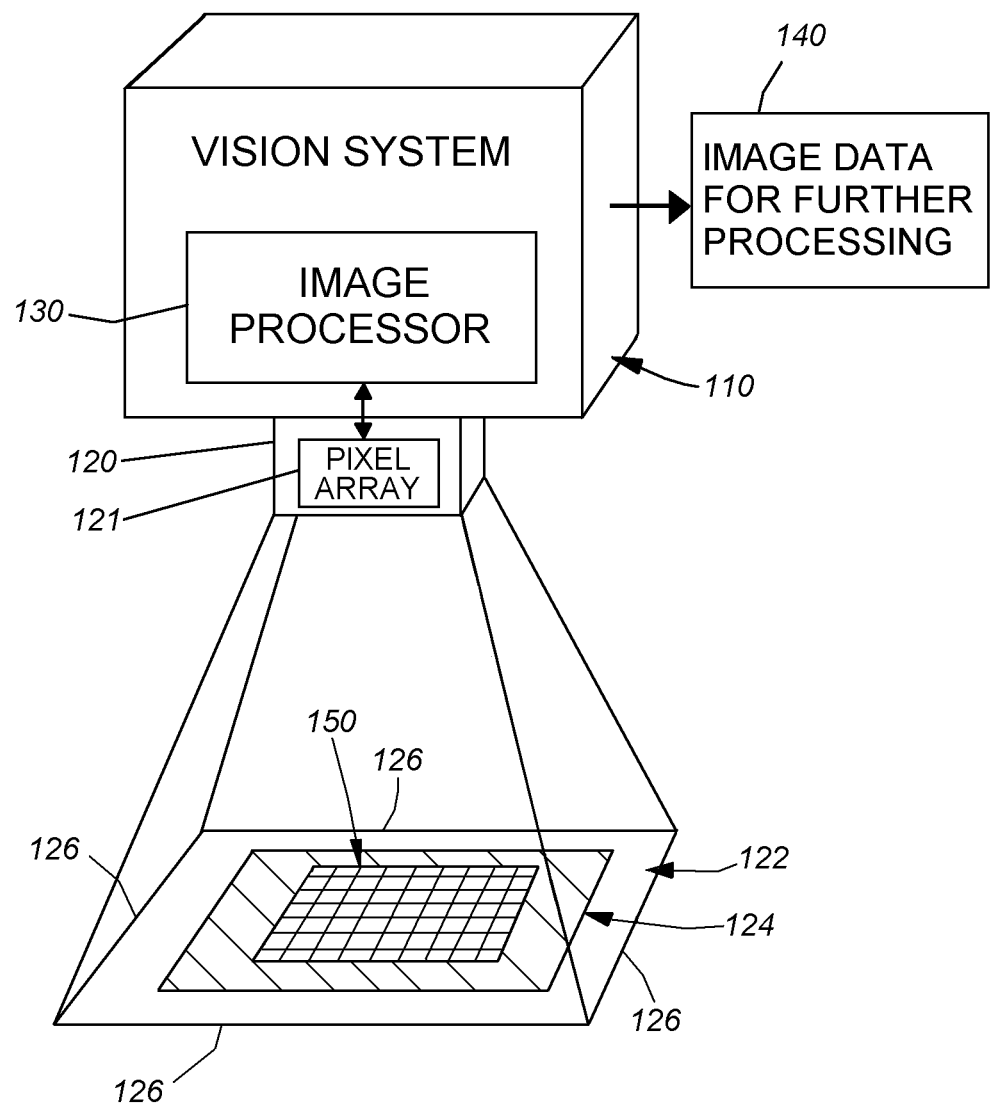
FIG. 1, already described, is a perspective view of an exemplary vision system processing arrangement acquiring images within a field of objects or surfaces having features of interest for further processing.
Figure 2:
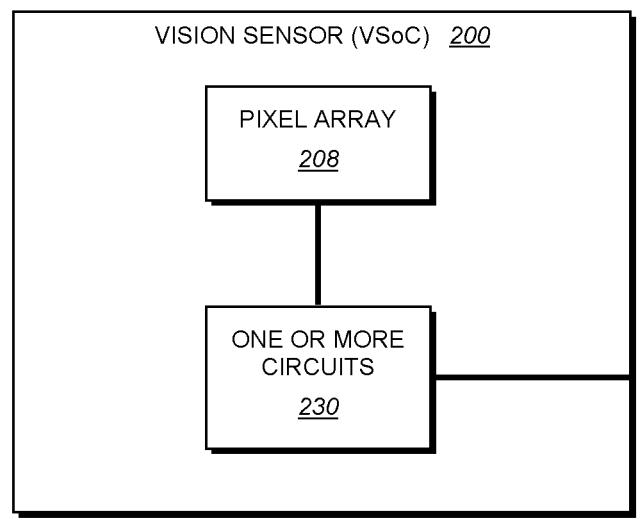
FIG. 2 is a block diagram of an exemplary vision system on a chip (VSoC) that can be provided as the vision system in accordance with an illustrative embodiment.

FIG. 2 illustrates a block diagram of a single chip vision system 200 (VSoC) for use with the system and method in accordance with an embodiment of the present invention. The VSoC 200 includes a pixel array 208 and one or more circuits 230 on a single chip. As used herein, the term "chip" can also be used interchangeably with the well-known term "die". That is, a single, unitary piece of silicon wafer having the appropriate circuit elements and traces laid out thereon. In manufacture, the chip or die can be part of a larger wafer of chips or dies that are separated into discrete packages at a given stage of the manufacturing process, but thereafter maintained as a unitary component. In various embodiments, the pixel array 208 is configured to provide pixel signals to the one or more circuits 230 based on sensed light for a scene being imaged. Also, in various embodiments, the one or more circuits 230 are configured to process the pixel signals provided from the pixel array 208 to form an image, and optionally are configured to perform pattern matching with respect to the image. In various embodiments, the pixel array 208 and the one or more circuits 230 form a single integrated circuit on a substrate of semiconductor material. Also, in various embodiments, the VSoC 200 includes one or more I/O pins (not shown) for inputting data to and outputting data from the VSoC 200.

The VSoC 200 can be employed in various applications, such as machine vision applications, consumer applications, or the like. In various embodiments, the VSoC 200 may be employed in applications in which there is a need for one or more of (i) image acquisition; (ii) image pre-processing; and (iii) pattern matching. In various embodiments, the VSoC 200 allows for performing image acquisition, image pre-processing, and/or pattern matching in a single chip or integrated circuit.

Figure 3:
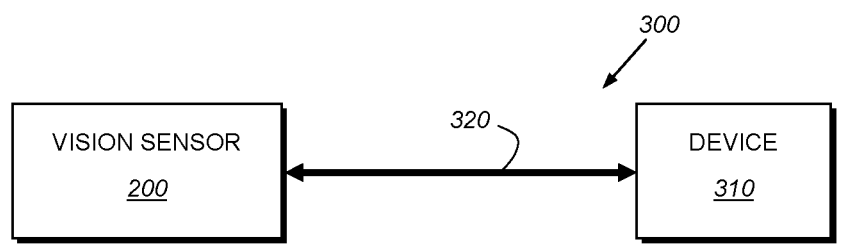
FIG. 3 is a block diagram showing the interconnection of the VSoC of FIG. 2 with an associated device.

With further reference to the VSoC 200, FIG. 3 illustrates a block diagram of an interconnected system 300 in accordance with an embodiment of the present invention. The system 300 includes the VSoC 200 and an interconnected device 310, operatively connected by a wired or wireless network or other data connection 320. In the system 300, the VSoC 200 is in communication with the device 310 and signals are transmitted between the device 310 and the VSoC. In an illustrative embodiment, the depicted device 310 can represent a component or components (such as a display, a separate ID decoder circuit, various indicators and alerts, etc.) of a scanning appliance, and/or a base computer (PC) or other data-processor that receives the ID data from the scanning appliance. The communication between the device 310 and the VSoC can include a variety of data and control signals. In various embodiments, the VSoC 200 is configured to acquire an image, and to perform processing on the image, and to provide data to the device 310 based on a result of the processing. For example, in various embodiments, the VSoC 200 is configured to search for one or more features in an image based on one or more models of the one or more features, and to output data to the device 310 based on a result of the search. By allowing for performing both image acquisition to acquire an image and pattern matching to search for features in an image on a single chip or integrated circuit, an amount of data transmitted from the VSoC 200 may be reduced as compared to a case in which image data must be transmitted from the VSoC 200 to a separate processor external to the VSoC 200 for performing pattern matching by the separate processor.

For example, in various embodiments, the exemplary VSoC 200 can be employed to capture images, search the images for one or more features using a model of the one or more features, and then provide a trigger signal to the device 310 in cases where the one or more features are found in an image. Also, in some embodiments, the VSoC 200 can be employed to obtain images, search the images for one or more features using a model of the one or more features, and then provide location data indicating locations of the one or more features in a physical scene to the device 310 in cases where the one or more features are found in an image. As a consequence, in such embodiments, rather than transmitting entire image data from the VSoC 200 to a separate external processor to cause the separate external processor to perform a search for features, the VSoC 200 can perform the search on the vision sensor chip. In such cases, the VSoC can transmit the more-minimal information contained in a trigger signal, alignment/location data, feature data or the like, to the device 300—which allows for reducing an amount of data transmitted off-chip from the VSoC 200.

In various embodiments, reducing an amount of data transmitted from the VSoC 200 allows for increasing a speed, in frames per second, at which the VSoC 200 is able to acquire images, because the VSoC 200 operation is less constrained by the completion of transmission operations. For example, in some embodiments, the VSoC 200 may be configured to capture and process images at a rate greater than 200 frames per second, which could allow the VSoC 200 to be advantageously used for applications such as automated video surveillance, vehicle control, triggering and feature detection/extraction in ID readers/scanning appliances (as described below), gesture recognition, dimensioning of objects through three-dimensional (3D) modeling using a static or moving vision sensor, motion analysis, and/or the like.

In various embodiments, the VSoC 200 may be configured to self-trigger so that, in various embodiments, the VSoC 200 can image its surroundings continuously, acquiring a continuous stream of images. More particularly, the VSoC 200 can be configured to provide a trigger to be used as a software or hardware trigger for other vision applications, such as a software trigger for ID readers by which a region of interest containing an ID candidate is processed in an attempt to detect and identify ID features for decoding by an associated decoding process or application on, for example an interconnected device (as described further below).

Reducing an amount of data transmitted off-chip from the VSoC 200 also allows for lower power dissipation, since less current is needed to drive signals off the chip. Likewise, this reduces electromagnetic interference (EMI) due a reduced exchange of data between the VSoC 200 and external devices. Reducing power dissipation has advantages in many applications, such as battery limited applications.

In some embodiments, the device 310 is a type of device that is capable of processing image data and the VSoC 200 is configured to transmit image data to the device 310. In some embodiments in which the VSoC 200 is configured to transmit image data to the device 310, the VSoC 200 is configured to search an image for one or more features using a model of the one or more features, and to transmit image data of the image to the device 310 only if at least one of the one or more features are found in the image. Also, in some embodiments in which the VSoC 200 is configured to transmit image data to the device 310, the VSoC 200 is configured to search an image for one or more features using a model of the one or more features, and to transmit to the device 310 only image data for regions of interest in the image that are determined based on identified features from the search. In various embodiments in which the VSoC 200 is configured to transmit image data to the device 310, the VSoC 200 may be controllable to send entire image data for images to the device 310. In some embodiments, the VSoC 200 is configured to transmit pose information to the device 310 that indicates poses of a model relative to an image for which one or more features have been detected.

In various embodiments, the device 310 can comprise a processor, and the VSoC 200 can be configured to interactively exchange processing tasks with the processor of the device 310 and/or to allow a user to specify which specific tasks are to be performed by each of the VSoC 200 and the processor of the device 310, so as to allow, for example, for optimization of throughput, use of memory, or the like. Also, in various embodiments, the device 310 may comprise a processor, and the VSoC 200 may be configured to determine candidate images or portions of images that may contain one or more features and then transfer the candidate images or portions of images to the device 310 for further processing by the device 310. In some embodiments, the VSoC 200 can be used in connection with one or more other components (not shown), such as auto-focusing optics, adaptive equipment, or the like, to provide different depths of field or different illumination, for example, while acquiring images and optionally processing them, within a useful time period for various applications.

The exemplary VSoC described herein, and other implementations generally contemplated desirable act as a so-called data "funnel" in that these implementations facilitate the conversion of a set of captured image data into a reduced size of data to be transmitted to the device 310 while retaining the meaningful informational aspects of that reduced data set sufficient to perform further back-end and/or off-chip processing. By way of example, such funneling operations include but are not limited to (a) processing the image data from the array to generally reduce the size and/or depth of the device-transferred image; (b) processing the image to extract features of reduced size when compared to the original image, and transferring the reduced-size feature set to the device; and (c) processing numerous image frames, and transmitting a reduced number of images therefrom, either in their entirety, or with a reduced set of data. Furthermore, the VSoC implementations contemplated for use in accordance with the system and method herein generally enable the preprocessing of an image or other or other processed data (e.g. edges, ROIs, etc.), and transmission of this preprocessed data to a device (310) where the preprocessing is more efficiently accomplished by the VSoC, than the device. This allows for increased throughput speed, as the raw data is preprocessed more quickly in the VSoC to yield the more focused data set that may be more slowly processed by the device. In various implementations, the existence of a highly parallel processing environment, wherein the pixel data from an image can be simultaneously processed as large groupings (captured pixel data rows for example) facilitates the rapid preprocessing thereof. Certain operations that benefit from large-group processes, such as neighborhood operations, are carried out with substantially increased efficiencies in such parallel environments.

As will be described further below, with reference to the illustrative system and method, the funneling aspect of the implementation is enhanced by the fact that various VSoC implementations in accordance with this invention enable processing of stored data to generate more-refined and/or smaller-sized data sets to occur contemporaneous with the readout of data from the pixel array into a buffer memory. In an embodiment, this processing is performed in a row-by-row basis, but other groupings of simultaneously processed data are also contemplated. This is due to the high speed at which data can be processed versus the frame-per-second (FPS) capture rate of raw image data.

Figure 4:
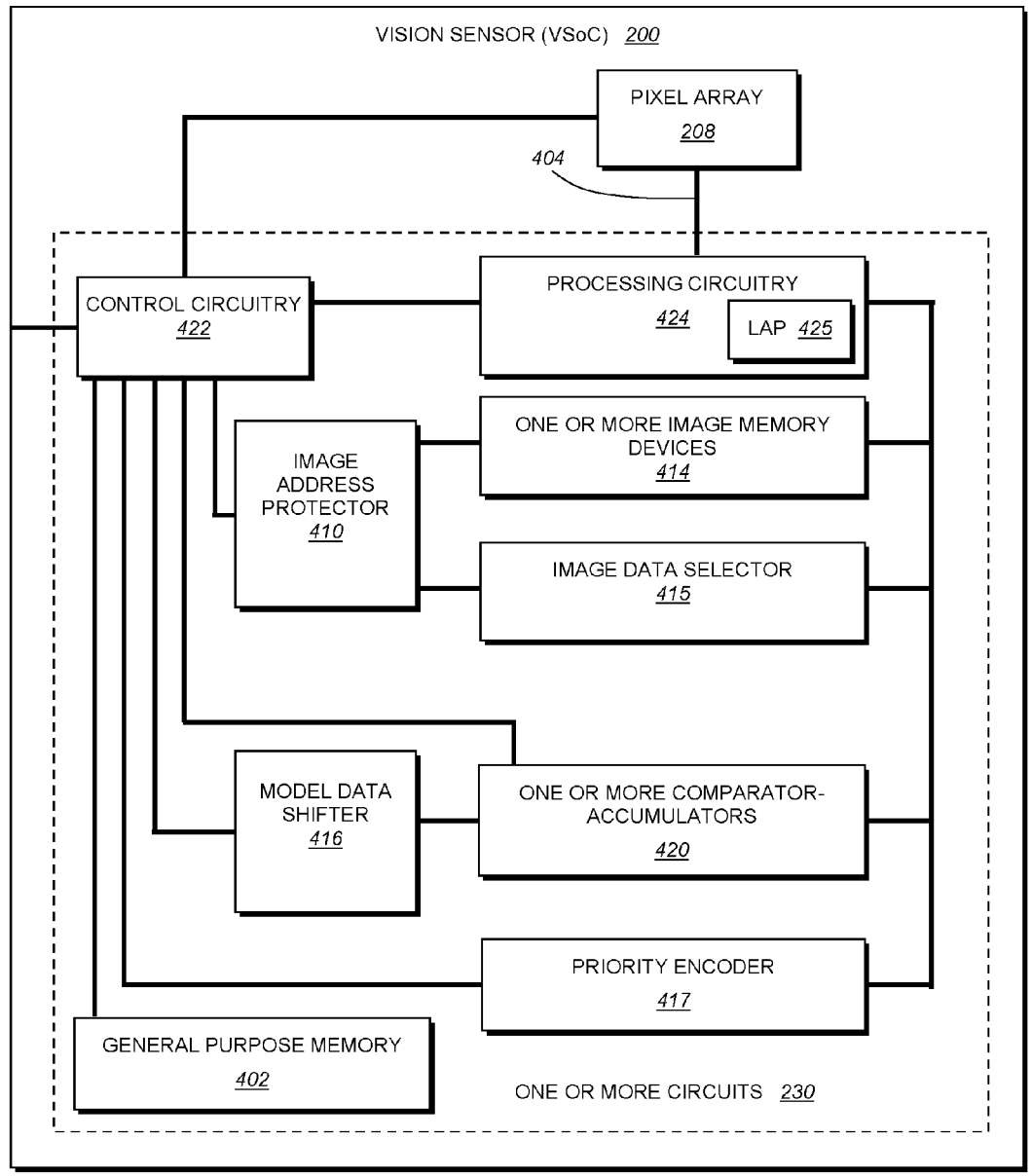
FIG. 4 is a block diagram showing the functional components of the VSoC of FIG. 2.

FIG. 4 illustrates the internal architecture of an embodiment of the VSoC 200. The VSoC 200 includes the above-described pixel array 208 and the above-described one or more circuits 230 (FIG. 2). In various embodiments, the one or more circuits 230 include control circuitry 422, a general purpose memory 402, processing circuitry 424, an image address processor 410, one or more image memory devices 414, an image data selector 415, a model data shifter 416, one or more comparator-accumulators 420, and a priority encoder 417.

In various embodiments, the pixel array 208 is configured to provide one or more pixel signals based on sensed light for a scene being imaged. Also, in various embodiments, the processing circuitry 424 is configured to process the one or more pixel signals provided from the pixel array 208 to generate an image. In general, the processing circuitry of an illustrative embodiment is implemented as a SIMD architecture in which an entire row of pixel data transferred from the pixel array 208 is processed simultaneously, being transmitted over a wide bus 404 that also communicates with one or more image memory devices, also characterized by a wide bus capable of reading in or out the entire row of image pixel data simultaneously (i.e. on a common clock cycle). In some embodiments, the one or more pixel signals provided from the pixel array 208 are analog signals, and such signals are converted to digital signals prior to processing by the LAP by appropriate ADC circuits. In various embodiments, the processing circuitry 424 is configured to perform one or more pre-processing operations on the digital pixel values obtained from the one or more pixel signals, so as to provide pre-processed image data.

By way of example, in various embodiments the processing circuitry 424 is configured to perform pre-processing for noise reduction to reduce noise in the digital pixel values. Image noise is random fluctuations of pixel values, which may be caused by electronic noise in the VSoC 200, or the like. In various embodiments, the processing circuitry 424 is configured to accomplish noise reduction through a filtering process, such as median filtering in which an original pixel value is replaced with a median value of intensities of neighboring pixel values. This noise reduction filtering function is described further below. In some embodiments, the processing circuitry 424 is configured to perform other types of filtering, such as low-pass filtering in which noise is reduced by convolving data of the pixel values with a mask that represents a smoothing operation so as to try to bring each pixel value closer to values of neighboring pixel values. It should be appreciated that median filtering and low-pass filtering are merely provided as examples of types of filtering and that, in various other embodiments, the VSoC 200 may be configured to perform other types of filtering.

In various embodiments, the processing circuitry 424 is also configured to perform pre-processing to convert a 6-bit or 8-bit (or other value) grayscale pixel values to 1-bit binary pixel values. In some embodiments, the processing circuitry 424 is configured to perform a thresholding process that converts a grayscale pixel value into either an absolute black pixel value or a white pixel value based on, for example, a comparison between the grayscale pixel value and a threshold value. Such thresholding processes allow for binarization of pixel values. In various embodiments, the processing circuitry 424 is also configured to perform a morphological closing operation on data in which a dilation is performed using a structuring element and then an erosion is performed on the resulting data using a structuring element. Such morphological closing operations may be employed, for example, to shrink background color holes that are within foreground regions in an image.

In various embodiments, the one or more image memory devices 414 are configured to store image data of an image. For example, as described above, in various embodiments, the processing circuitry 424 performs processing on pixel data provided from the pixel array 208 and stores a result of the processing in the one or more image memory devices 414 as pixel intensity data of a captured image. In various embodiments, the one or more image memory devices 414 each comprise a random access memory (RAM), or the like, for storing and providing data. The size and layout of the RAM can be provided so that the rows of memory include addresses that correspond to the rows of the pixel array 208. Likewise the individual SIMD processors in the processing circuitry (collectively defining the above-described LAP) 425 can number the same as the number of elements in a given pixel array and memory row. In various embodiments, the control circuitry 422 is configured to control the pixel array 208 to capture light and provide pixel signals, and is configured to control the processing circuitry 424 to process the pixel signals from the pixel array 208 to provide image data of an image. In some embodiments, the pixel array 208 is configured to capture light that is in the visible spectrum and to provide pixel signals based on the captured light. In some embodiments, the pixel array 208 is configured to capture light that is also (or alternatively) outside of the visible spectrum and to provide pixel signals based on the captured light. In some embodiments, the pixel array 208 is configured to allow for capturing light from both the visible spectrum and outside of the visible spectrum and to provide pixel signals based on the captured light.

In various embodiments, the control circuitry 422 is configured to receive model instructions from an external device such as the above-described PC for a model of one or more features, and is configured to store the model instructions in the general purpose memory 402. In various embodiments, the general purpose memory 402 comprises a RAM, or the like, for storing and providing data. In various embodiments, the general purpose memory 402 stores programs that can be executed by the control circuitry 422. In some embodiments, the general purpose memory 402 may be supplemented with an external memory (not shown) that is external to the VSoC 200, and the VSoC 200 can be configured in such embodiments to allow for transferring data between the external memory and the general purpose memory 402. In various embodiments, elements of FIG. 4 can be supplemented or omitted if desired for various different applications—some of which variations are described below with reference to the illustrative system and method.

In various embodiments, the one or more circuits 230 are configured to search an image for one or more features using a model of the one or more features. In some embodiments, an image to be searched is stored in the one or more image memory devices 414, and model instructions of a model of one or more features to be used to search the image are stored in the general purpose memory 402. Also in various embodiments, the control circuitry 422 is configured to execute the model instructions from the general purpose memory 402, and to control the processing circuitry 424, the image address processor 410, the model data shifter 416, and the plurality of comparator-accumulators 400 based on the model instructions. In some embodiments adapted to perform image-matching and object/feature pose (alignment) determination, each model instruction includes corresponding coordinates that specify a position with respect to a model reference point. Also, in some embodiments, the control circuitry 422 is configured to provide coordinates from model instructions of a programmed image model to the image address processor 410, and the image address processor 410 is configured to transform the coordinates into transformed coordinates based at least partially on one or more transform values. In various embodiments, the image address processor 410 allows for transforming coordinates of a model in accordance with a geometric transformation.

Having the ability to transform coordinates of a model in accordance with a geometric transformation provides an advantage when searching for features in images where the features in the images may be rotated at different angles, scaled to different sizes, or translated to different positions in different images. In some instances, with the ability to geometrically transform a model of a feature, the model may be used to detect the feature in images regardless of a rotation, scale, or location of the feature in the images. In various embodiments, the image address processor 410 is configured to transform one or more coordinates of a model in accordance with one or more affine transform values.

In various embodiments, the image address processor 410 is configured to provide a first coordinate of transformed coordinates to the one or more image memory devices 414 to access the one or more image memory devices 414 and to cause the one or more image memory devices 414 to provide data addressed by the first coordinate of the transformed coordinates to the image data selector 415. In various embodiments, the image address processor 410 is also configured to provide a second coordinate of the transformed coordinates to the image data selector 415 to cause the image data selector 415 to shift the data received from the one or more image memory devices 414 by an amount that is based on the second coordinate of the transformed coordinates.

In various embodiments, the control circuitry 422 is configured to provide accumulation increments and one or more values to the model data shifter 416 from a model, and the model data shifter 416 is configured to provide the one or more values and the accumulation increments to the one or more comparator-accumulators 420. In embodiments, the one or more comparator-accumulators 420 are configured to compare one or more values obtained based on data of an image to be searched with one or more values from a model. Also, in various embodiments, the one or more comparator-accumulators 420 are configured to selectively perform accumulation to accumulate accumulation increments based on results of the comparisons.

In various embodiments, the processing circuitry 424 is also configured to receive accumulated values from the one or more comparator-accumulators 400 and to form a binary tag word to indicate local maximum responses to comparisons between an image and model data. Additionally, the priority encoder 417 can be configured to receive a binary tag word from the processing circuitry 424 and to provide output to the control circuitry 422 based on the binary tag word. In various embodiments, the control circuitry 422 is further configured to provide output from the VSoC 200.

Figure 5:
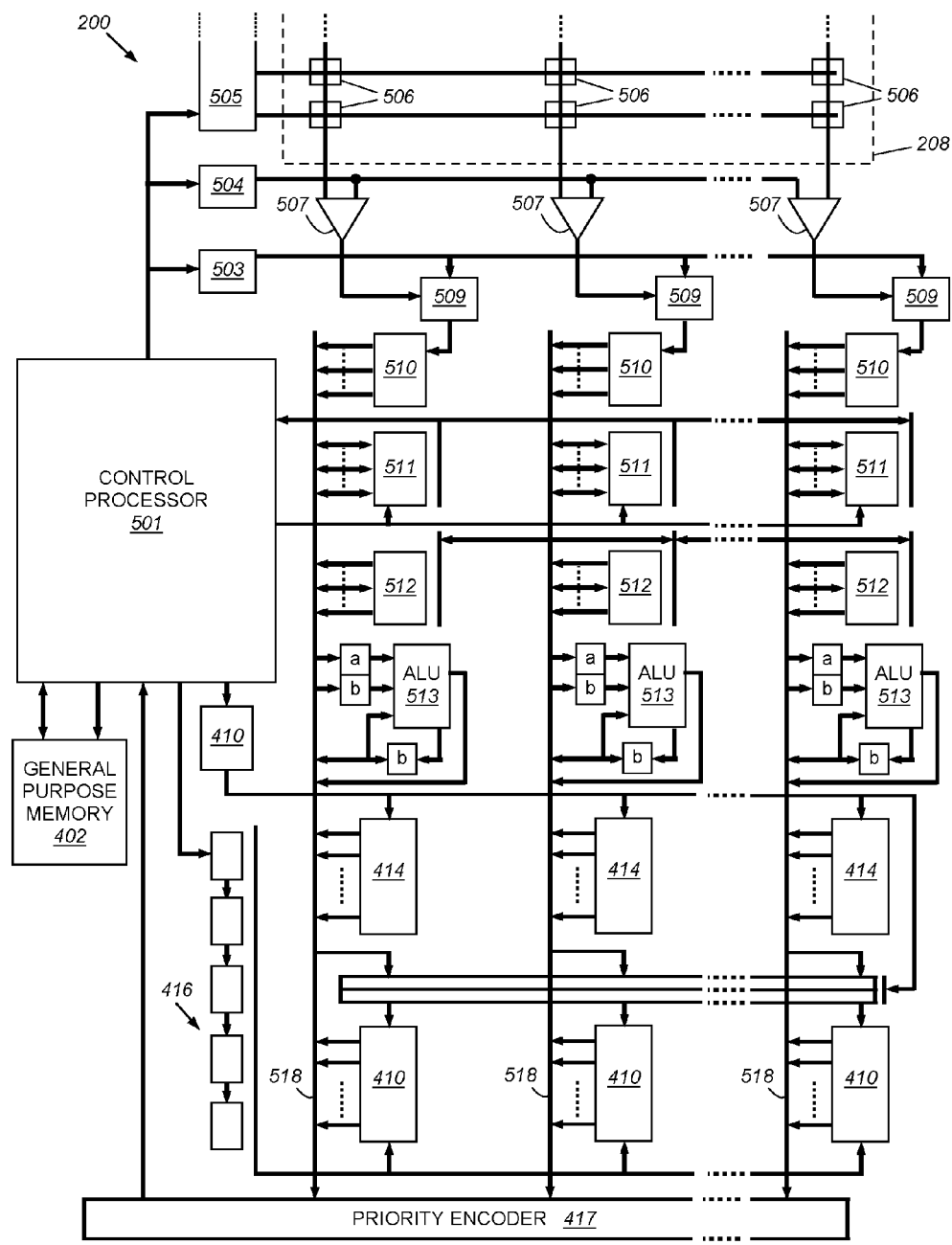
FIG. 5 is a more detailed schematic diagram showing functional components of the VSoC of FIG. 2 and including details of individual components of the linear array processor (LAP) according to an illustrative embodiment.

FIG. 5 illustrates a more detailed depiction of an embodiment of the VSoC 200. In various embodiments, the VSoC 200 includes the above-described pixel array 208, along with a pixel controller 505, a plurality of analog comparators 507, an analog ramp generator 504, a plurality of analog-to-digital converter (ADC) latches 509, and a digital ramp generator 503. In various embodiments, the pixel array 208 includes a plurality of pixel circuits 506 that are arranged in rows and columns. Also, in various embodiments, each pixel circuit 506 comprises a light-sensitive element or photodetector, such as a photodiode or the like, to sample light intensity of a corresponding portion of a scene being imaged, and each pixel circuit 506 is configured to provide an analog pixel signal based on the sampled light intensity.

In various embodiments, the pixel controller 505 supplies control signals to the pixel circuits 506 in the pixel array 208 to control an operation of the pixel circuits 506. In some embodiments, pixel circuits 506 that are in a same row of the pixel array 208 share a common row control signal from the pixel controller 505, and pixel circuits 506 that are in a same column of the pixel array 208 share a common column readout line to provide output. In various embodiments, the pixel controller 505 controls the pixel circuits 506 to provide output of data in a row-by-row manner. Also, in various embodiments, the analog pixel signals output from each column of pixel circuits 506 in the pixel array 208 are input to a corresponding analog comparator 507.

In various embodiments, analog-to-digital conversion of analog pixel signals output from the pixel array 208 is performed using the plurality of analog comparators 207, the analog ramp generator 204, the plurality of ADC latches 209, and the digital ramp generator 503. In some embodiments, analog pixel signals output at each column of the pixel array 508 are compared, in the corresponding analog comparator 507, to a common analog reference level generated by the analog ramp generator 504. Also, in some embodiments, the digital ramp generator 503 is configured to produce a digital signal that is representative of the analog reference level generated by the analog ramp generator 504. In various embodiments, in a case where on any given column the analog reference level equals a level of the analog pixel signal, the corresponding analog comparator 507 generates a digital output that causes a corresponding ADC latch 509 to latch a value of the digital signal supplied by the digital ramp generator 503.

In various embodiments, the VSoC 200 further includes a control processor 501, the above-described general purpose memory 402, a plurality of image input registers 510, a plurality of input/output (I/O) registers 511, a plurality of shift registers 512, a plurality of arithmetic logic units (ALUs) 513, a plurality of image memory devices 414 (described above), and a plurality of data paths 518 that interconnect the various circuit components via appropriately sized buses. In various embodiments, the control processor 501 is connected to the general purpose memory 502, from which it obtains programs and models to execute to control elements of the VSoC 200. In various embodiments, each ADC latch 509 is connected to a corresponding image input register 510, and each image input register 510 is connected, by output data lines, to a corresponding branch of the data path 518.

In various embodiments, each data path 518 includes a serial data path that carries data in bit-serial form. In various other embodiments, each data path 518 can include a plurality of data lines for carrying data. In some embodiments, the plurality of data paths 518 are part of a bus. Also, in some embodiments, there is at least one data path 518 for each column of pixel circuits 506 in the pixel array 208. In various embodiments, each data path 518 is connected to a corresponding image input register 510, a corresponding I/O register 511, a corresponding shift register 512, a corresponding ALU 513, and a corresponding image memory device 414. Also, in various embodiments, the plurality of I/O registers 511 are each connected to the control processor 501 for inputting data from and outputting data to the control processor 501. In some embodiments, the plurality of shift registers 512 are each connected to their immediate neighbors on the left and right, if present. Also, in some embodiments, each ALU 513 is connected to the corresponding data path 518 through a set of corresponding registers, which include at least two data input registers (a and b), and a carry register (c).

In various embodiments, each image input register 510 makes digitized image data available, by way of the corresponding data path 518, to the corresponding I/O register 511, the corresponding shift register 512, the corresponding ALU 513, and the corresponding image memory device 414. In various processing operations, image data is buffered in the plurality of image memory devices 414 and processed using the plurality of ALUs 513 that collectively comprise part of the LAP 425. In various embodiments, processed image data or other data may be accessed by the control processor 501 though the plurality of I/O registers 511 for secondary data processing and/or external communication of data with devices that are external to the VSoC 200.

With reference to FIGS. 4 and 5, in various embodiments, the control circuitry 422 includes the control processor 501 and the pixel controller 505. Also, in various embodiments, the processing circuitry 424 includes the plurality of analog comparators 507, the analog ramp generator 504, the plurality of ADC latches 509, the digital ramp generator 503, the plurality of image input registers 510, the plurality of I/O registers 511, the plurality of shift registers 512, and the plurality of ALUs 513. In various embodiments, the one or more image memory devices 414 (FIG. 4) include the plurality of image memory devices 414 as illustrated in FIG. 5.

With further reference to FIG. 5, in various embodiments the VSoC 200 further includes the image address processor 410, the image data selector 415, the model data shifter 416, a plurality of comparator-accumulators 420, and the priority encoder 417. In various embodiments, each of the data paths 518 is connected to the image data selector 415. Also, in various embodiments, the control processor 501 is connected to the image address processor 410, and the image address processor 410 is, in turn, connected to address inputs of the plurality of image memory devices 414 and a control input of the image data selector 415.

In some embodiments, the control processor 501 is connected to an input of the model data shifter 416, and an output of the model data shifter 416 is connected to an input of each of the plurality of comparator-accumulators 420. Each comparator-accumulator 420 is also connected to receive input from the image data selector 415. In various embodiments, the image data selector 415 comprises a bi-direction barrel shifter, or the like. Also, in various embodiments, each of the plurality of comparator-accumulators 420 is operatively connected to a corresponding data path 518. In some embodiments, the priority encoder 417 is connected to each of the data paths 518 and is connected to the control processor 501. It should be appreciated that the connectivity and organization of the architecture of the VSoC 200 illustrated in FIG. 5 is provided by way of example, and in various other embodiments, the VSoC 200 may have other suitable arrangements.

Figures 6, 7:
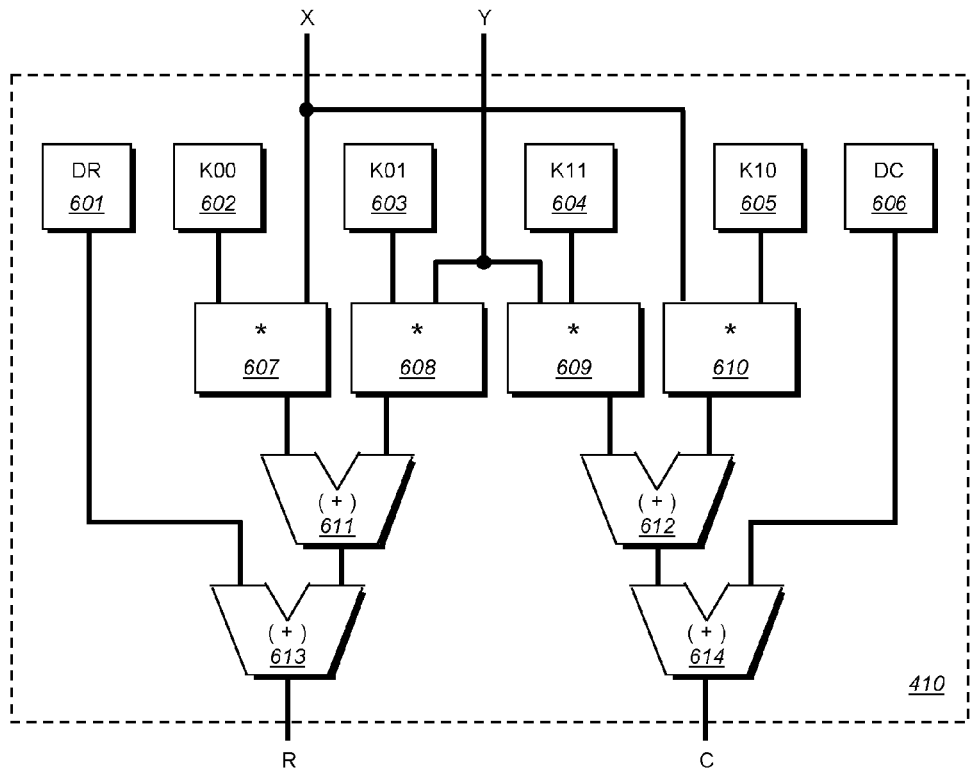
FIG. 6 is a block diagram of an image address processor of the VSoC of FIG. 2 for transforming coordinates of a model according to an illustrative embodiment.
FIG. 7 is a text block detailing exemplary equations for transforming coordinates of a model by the VSoC according to an illustrative embodiment.

FIG. 6 illustrates a block diagram of an embodiment of the image address processor 410 for use in the VSoC 200. In various embodiments, the image address processor 410 is configured to transform coordinates of a model into transformed coordinates based at least partially on one or more transform values. In various embodiments, the image address processor 410 includes transform coefficient registers 602, 603, 604, and 605, an image row offset register 601, and an image column offset register 606, for storing transform values. In various embodiments, the image address processor 410 further includes signed multipliers 607, 608, 609, and 610, and adders 611, 612, 613, and 614.

By way of an example of the operation of the address processor, a first coordinate of a model (denoted X in FIG. 6), and a second coordinate of the model (denoted Y in FIG. 6) are provided as input to the image address processor 410. With reference to FIGS. 5 and 6, in various embodiments the control processor 501 is configured to fetch a model instruction of a model from the general purpose memory 402 and to provide coordinates that are included in the model instruction to the image address processor 410. For example, the control processor 501 can be configured to fetch a model instruction of a model, such as a first model instruction of the model that is provided as an example model, from the general purpose memory 402 and to provide coordinates that are included in the model instruction, such as the coordinates (−7, −2) in the example, to the image address processor 410. In the example, the value of −7 for a first coordinate would be provided as the X input to the image address processor 410, and the value of −2 for a second coordinate would be provided as the Y input to the image address processor 410.

As shown in FIG. 6, in various embodiments the transform coefficient registers 602, 603, 604, and 605 are writable to store affine transform coefficients K00, K01, K11, and K10, respectively, where the values of K00, K01, K11, and K10 are settable to enable performing desired transformations. In various embodiments, the image row offset register 601 is writable to store a row offset value DR, and the image column offset register 606 is writable to store a column offset value DC, where the values DR and DC are settable. In various embodiments the control processor 501 (FIG. 5) is configured to set the values K00, K01, K11, K10, DR, and DC in the image address processor 410 based on a desired geometric transformation for a model.

In various embodiments, the signed multiplier 607 receives an input from the transform coefficient register 602 and an input that is a first coordinate to be transformed, and provides an output to the adder 611. Also, in various embodiments, the signed multiplier 608 receives an input from the transform coefficient register 603 and an input that is a second coordinate to be transformed, and provides an output to the adder 611. In various embodiments, the signed multiplier 609 receives an input from the transform coefficient register 604 and an input that is the second coordinate to be transformed, and provides an output to the adder 612. Also, in various embodiments, the signed multiplier 610 receives an input from the transform coefficient register 605 and an input that is the first coordinate to be transformed, and provides an output to the adder 612.

In various embodiments, the adder 611 receives input from the signed multiplier 607 and the signed multiplier 608, and provides output to the adder 613. Also, in various embodiments, the adder 612 receives input from the signed multiplier 609 and the signed multiplier 610, and provides output to the adder 614. In various embodiments, the adder 613 receives input from the image row offset register 601 and the adder 611, and provides as output a first transformed coordinate (denoted R in FIG. 6). Also, in various embodiments, the adder 614 receives input from the image column offset register 606 and the adder 612, and provides as output a second transformed coordinate (denoted C in FIG. 6). Thus, in the embodiment of FIG. 6, the image address processor 600 allows for transforming coordinates (X, Y) into transformed coordinates (R, C) based on a plurality of transform values K00, K01, K11, K10, DR, and DC.

FIG. 7 shows a text box 710 with equations that specify a relationship between the (X, Y) inputs and the (R, C) outputs for the embodiment of the image address processor 410 of FIG. 6. As illustrated in FIG. 7, the equation for R is provided as R=X*K00+Y*K01+DR, and the equation for C is provided as C=X*K10+Y*K11+DC. Thus, the embodiment of the image address processor 410 of FIG. 6 allows for transforming coordinates of a model in accordance with geometric transformations, such as a rotation, a scaling, or a translation, by setting the transform values for a desired geometric transformation. By allowing for geometric transformations through use of the image address processor 410, a model of one or more features can be used for pattern matching for different rotations, scales, and translations of the one or more features in images.

In the embodiment of the image address processor 410 of FIG. 6, the image address processor 410 allows for transforming coordinates based on the six transform values of K00, K01, K11, K10, DR, and DC. Thus, the embodiment of the image address processor 410 of FIG. 6 allows for six degrees of freedom for transformations. Of course, it should be understood that in various other embodiments of the image address processor 410, more transform values than six may be employed to allow for more than six degrees of freedom for transformations. For example, in various embodiments, another three transform values are provided in the image address processor 410 and the image address processor 410 is configured to further allow for transformations for perspective distortions. It should also be understood that in various other embodiments, less transform values than six may be employed in embodiments of the image address processor 410. For example, various embodiments of the image address processor 410 may allow for setting just two transform values to allow for translations. Also, it should be appreciated that the embodiment of the image address processor 410 illustrated in FIG. 6 is provided by way of example of an implementation of an illustrative image address processor, and that in various other embodiments, alternate arrangements can be employed as an image address processor for use in transforming coordinates.

Figure 8:
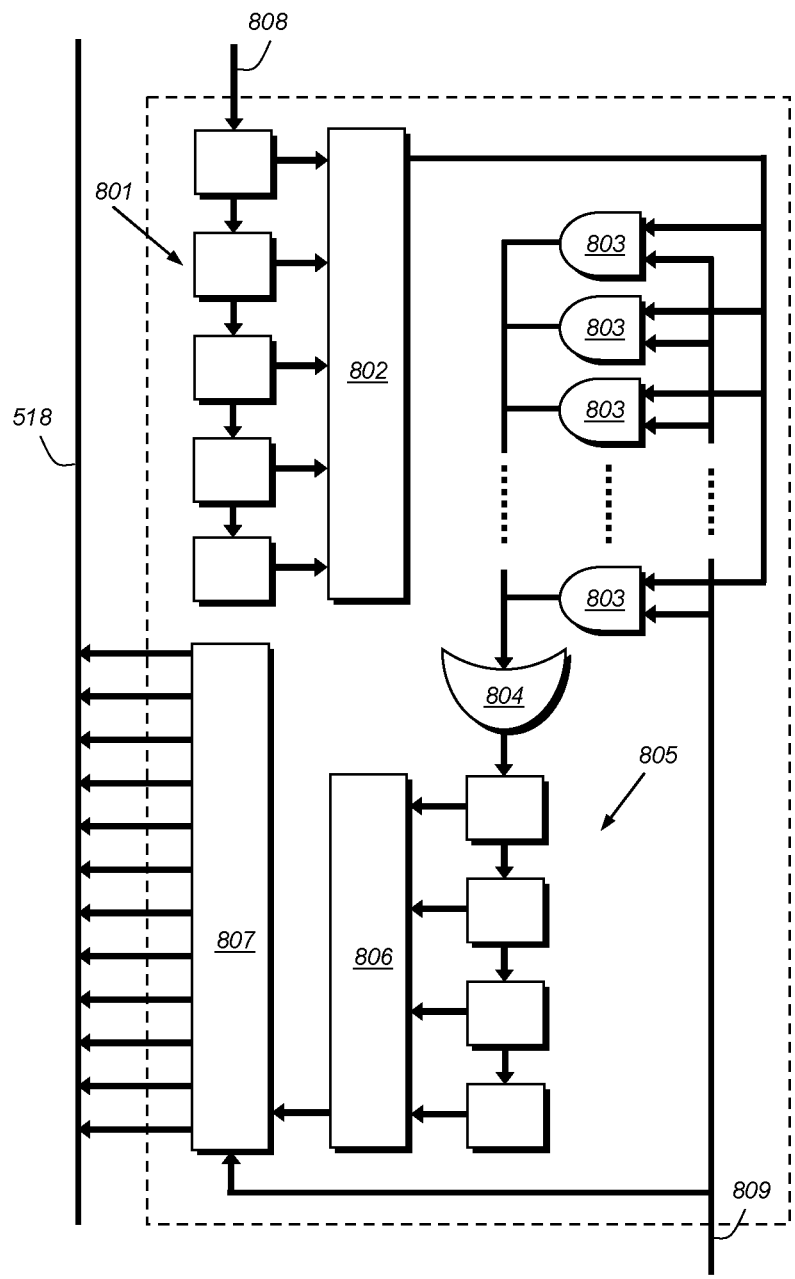
FIG. 8 is a schematic diagram of a comparator-accumulator of the VSoC of FIG. 2 according to an illustrative embodiment.

FIG. 8 illustrates a block diagram of an embodiment of a comparator-accumulator 420 for use in the VSoC (FIG. 4). In various embodiments, the comparator-accumulator 420 includes an image data shifter 801, an image data decoder 802, a plurality of AND gates 803, an OR gate 804, a match shifter 805, a match encoder 806, and a match accumulator 807. In various embodiments, the image data shifter 801 is configured to receive data on an image data input line 808 and to shift the data by one position within the image data shifter 801 each time the image data shifter 801 is clocked to shift. Also, in various embodiments, the image data shifter 801 is configured to provide output to the image data decoder 802.

In various embodiments, the image data decoder 802 is configured to decode a value provided from the image data shifter 801, and to provide each bit of a decoded value to a corresponding first input of a corresponding AND gate of the plurality of AND gates 803. Also, in various embodiments, each bit of one or more model values of a model is provided over one or more model data input lines 809 to a corresponding second input of a corresponding AND gate of the plurality of AND gates 803.

In various embodiments, bits from an image may be shifted into the image data shifter 801 and then decoded by the image data decoder 802 through binary expansion into a bit string with a "1" bit in a bit position corresponding to a decimal value of a binary number in the image data shifter 801, and a "0" bit in all other positions, where a low-order bit in the decoded bit string corresponds to a bit position of 0. Then, in various embodiments, the decoded bit string from the image data decoder 802 may be compared using the plurality of AND gates 803 with the bit string provided over the one or more model data input lines 809 that has been reconstructed from values in a model. In various embodiments, the OR gate 804 receives an output of each of the plurality of AND gates 803, and provides an output bit of "1" in a case where any of the outputs of the plurality of AND gates 803 is "1". In some embodiments, the OR gate 804 can be replaced with a plurality of OR gates configured to determine if any of the plurality of AND gates 803 have output a bit with a value of "1". In various embodiments, an output of the OR gate 804 is indicative of whether or not a match has been found between image data of an image and model data of a model for a particular geometric transformation of the model and a particular positioning of the geometrically transformed model with respect to the image. In various embodiments, the plurality of AND gates 803 and the OR gate 804 may be considered as a comparator. Of course, it should be appreciated that the plurality of AND gates 803 and the OR gate 804 are provided by way of example, as an arrangement for performing a comparison, and that in various other embodiments, other types of comparators can be employed.

In various embodiments, an output of the OR gate 804 is provided to the match shifter 805, and the match shifter 805 is configured to input a bit provided from the OR gate 804 and to shift the other bits in the match shifter 805 by one position each time the match shifter 805 is clocked. In various embodiments, data in the match shifter 805 is output to the match encoder 806, and the match encoder 806 is configured to encode a value represented by the stored bits in the match shifter 805, and to provide an output to a clock of the match accumulator 807. In various embodiments, the match accumulator 807 receives an accumulation increment of a model over the one or more model data input lines 809, and is configured to accumulate the accumulation increment when clocked based on a value of an output of the match encoder 806. Also, in various embodiments, the match accumulator 807 is configured to output a value that has been accumulated in the match accumulator 807 to a corresponding data path 518.

In various embodiments, the control circuitry 422 (FIG. 4) is configured to send a signal to each of the comparator-accumulators 420 to cause the match accumulator 807 in each of the comparator-accumulators 420 to be reset to a default value when the control circuitry 422 executes a model instruction that includes a reset command. Also, in various embodiments, the control circuitry 422 is configured to send a signal to allow for accumulation by the match accumulator 807 in each of the comparator-accumulators 420 when the control circuitry 422 executes a model instruction that includes a compare command. In such embodiments, the match accumulator 807 in each of the comparator-accumulators 420 can also be clocked by an output of the corresponding match encoder 806, such that when accumulation is allowed, the match accumulator 807 either performs or does not perform accumulation depending on a value output from the corresponding match encoder 806.

II. VSoC System Implementation

In an illustrative embodiment of the system and method for method for processing discrete image data within an overall set of acquired image data based upon a focus of attention within that image, the vision sensor (VSoC) 200 as implemented in an overall vision system architecture is provided. Various elements described with respect to the above-described illustrative VSoC 200 are reorganized for ease of cross-reference to functions in the present system and method. For example, elements of a read-out circuitry reside partially within the above-described control circuitry 422 and partially within the processing circuitry 424 (FIGS. 4 and 5). Likewise, the LAP 425 is a part of the overall processing circuitry 424. Additional functions and interconnections (for example, an off-die second processor, and various communication ports) are also described to assist the reader in further understanding the environment of the exemplary (or an alternate) VSoC architecture upon which the illustrative system and method can operate.

The depicted pixel array 208 images a field of view (FOV) containing an exemplary surface or object and an associated feature of interest, which contains the desired image information upon which a vision system decision or further process (e.g. barcode decoding) is based. The orientation of the pixel array 208 with respect to the FOV is highly variable in angle and rotation. Likewise, the pixel array can potentially be in motion with respect to the object/surface, with the frame rate of image capture and processing contemplated in accordance with this embodiment being capable of more-reliably capturing needed information for decoding in the presence of such movement. The illustrative pixel array can be configured as 1,028 columns by 786 rows. Such an array can include two dummy rows and columns on the top/bottom and left/right to avoid boundary effects, thus providing the illustrative 1,024-row X 782-column active 8-bit (or alternatively 6-bit) pixel array. Interconnected readout circuitry, including ADC circuits, and associated functionality as described above, converts the analog sensor output to digital pixel data that is read out as 1024-wide rows over an associated bus to the linear array processor (LAP) 425 in accordance with an illustrative embodiment. Note that the arrangement of the pixel array is highly variable. While the illustrative array is a 2D arrangement, in alternate implementations one or more 1D arrays can be employed.

The image capture process within the pixel array 208 is handled by the sensor controller. In an exemplary implementation, it consists of a programmable finite state machine (FSM) that generates the waveforms required to control the operation for each row of pixels in the array and the sequence of events for the readout circuitry. The operation of the sensor controller can be programmed by the user via configuration registers within a separate 16-bit processor 501 (the control processor 501 in FIG. 5 described above) that is part of the VSoC 200, and is described further below. These registers configure all the programmable parameters of the pixel array 208 and readout circuitry, including the parameters of the ROI, shutter mode, exposure time and the ADC resolution. Once an image frame is acquired, it is read out and converted to digital form on a 1024-wide row-by-row basis. In parallel with this readout and A/D conversion process, the LAP 425 processes the image according to the program code of the ROI-detection and feature-extraction application of this system and method (described below).

The LAP 425 is a parallel processor consisting of a one-dimensional array of 1,024 identical processing elements, each of them consisting of a 1-bit data path, 16 accumulator bits and a carry and an enable flag, as described generally above. The LAP 425 is implemented as a SIMD machine, so that all processors operate synchronously and perform the same operation but on different data.

Each LAP element can read and write one bit from a column (4,096 bits) of data memory. The row address is the same for all elements during an LAP-memory read or write cycle. Between the data memory and the LAP there is a barrel shifter that can be configured to shift the read-out data up to 13 places left or right. This permits each LAP element to have access (every clock-cycle) to the data from 13 columns left and right of its own position. The data memory (i.e. the one or more image memory devices 414 described above in FIG. 4) is interconnected via a wide 1024 bus 9 consists of four blocks of 1,024×1,024 bits. This memory is used to store the intermediate results of the image processing. It should be noted that the memory is adapted to store only portions of the overall processed image from the LAP. It also stores intermediate results of processing, such as ROI information and extracted features, as described below. Thus, data from the pixel array is constantly moved through the memory 414, being either disposed of if not relevant to a successful ID-finding operation, or moved on to a further step and processor, such as decoding, if the information shows promising ID characteristics. In a typical application, the acquired image is transferred to the LAP on a row-by-row basis. In the LAP 425, the data is processed to generate an equivalent binary image. This resulting binary image is progressively stored in the data memory for further processing. In some vision system embodiments, binary images can be processed by the VSoC's correlator to obtain normalized correlation and pattern matching information. Where appropriate, it can be used to accelerate normalized correlation and to perform pattern matching in an image. The Priority Encoder is optimized for detecting transitions in an image row. The above-described priority encoder (1024 bits wide) interacts with the memory 414 via the bus to provide for the fast detection of set bits in a data memory row.

There are a number of image-processing operations that are performed on the LAP 425 where the connectivity or distribution of points within an image row must be found. In an illustrative embodiment, to accelerate these operations the VSoC 200 incorporates a custom logic block implementing "propagate-generate" functions across the array. Two possible applications of the propagate/generate unit (on bus) are object location and "unknown point" resolution. The block is composed of 1,024 identical cells. Each cell has a pair of "propagate in" and "propagate out" signals communicating with the neighboring cells (corresponding to the right and left direction respectively). The inputs at the left and right sides of the array are set to zero. After writing an LAP 425 word to the propagate/generate unit, it illustratively requires 5 cycles until the value in the propagate/generate unit is valid.

The control processor 501 provides the VSoC 200 with a compact, fast processing unit that is separate from the LAP 425. The processor 501 in the illustrative embodiment is a 16-bit unit, but other sizes are contemplated. It provides efficient low-level image processing, and control for the LAP 425 and correlator. The processor 501 operates using a general purpose instruction set, and also supports additional special purpose instructions for operating on binary images, as such binary images are the typical mode of operation of the VSoC. The processor 501 supports interrupts, triggered from a number of sources including any major peripheral flags. The processor 501 is interconnected with the LAP 425 and the data memory 414 via a respective 16-bit bus.

In an exemplary embodiment the control processor 501 (also termed herein the "CPU") is implemented using a Harvard architecture with reduced instruction set computing (RISC), providing separate memories for program and data, although the program memory can also be used for data storage. It defines sixteen general purpose registers, R0 to R14. These registers are each 16-bits wide in the illustrative implementation. There is also an illustrative 17-bit program counter/sequencer, which allows the processor to directly address 65,536 16-bit words in program RAM (i.e. general purpose memory 402 above), and the same amount in program ROM 948 (although in this embodiment only the ROM only has 48K active words at present). All computation is conducted between registers. Thus, values from memory are loaded into a register before being operated-on.

The data memory 414 is accessed as 16-bit words via bus, using a register as a pointer. The register can be optionally pre-decremented or post-decremented or pre/post-incremented upon a memory access. A pointer plus constant offset addressing mode is also provided in the illustrative implementation. To allow accessing the full data memory of 256K words (512K bytes), a page register is used in the illustrative implementation. Binary images are packed into data memory with 16 pixels to a word. To allow efficient access, two pointer registers PX and PY are used. These are used to address a single pixel, and either or both can be independently post-incremented, post-decremented or left unmodified after an access. The PX register is 10-bits and the PY register is 12-bits to reflect the image mapping (1,024 columns by 4,096 rows).

A 128-word I/O space is also illustratively provided (not shown), which is directly accessed using absolute addressing. This contains many system and peripheral registers, with the remainder being occupied by scratch memory. An auxiliary register set is also provided for additional register operations. The accumulator bank of the LAP 425 (1,024 words of 16-bits) can be accessed using the PX register as a pointer. ALU operations are conducted between working registers using an ALU and a 16 by 16 multiplier-accumulator, which can take any two of the general registers as its operands. The 32-bit result of such operations is stored or accumulated to a 32-bit MR register (not shown). A shifter is illustratively provided that can shift down the MR register by between 0 and 31 places and put the result in a specified general register. The multiplier and shifter can be configured for either signed or unsigned operation.

The program memory 402 stores 65,536 words of 16 bits (part of the general purpose memory described above in FIG. 4). This RAM memory 402 can be physically organized as 32K words of 32-bits. The ROM can be organized as 24K words of 32-bits. A page register determines whether the ROM or SRAM are accessed, with separate pages for program fetch, program memory read and program memory write. At boot-up, the processor 501 initially executes from the ROM. The ROM contains boot software which reads the processor's boot configuration pins to determine the desired secondary boot mode. These modes include booting from the host parallel port (FIFO), booting from a host processor via a SPI slave port and booting from a serial flash via a SPI master port, all of which are interconnected to the processor via a 16-bit communications bus. Note that an SPI channel is provided to implement full duplex serial communication that allows bi-directional transfers of register values and data to/from the RAM. The standard SPI master port is intended for accessing serial flash memory, or other peripheral devices. Two select pins are provided to allow connection to two compatible devices under software control. The slave SPI port can be used as an alternative interface to a host microcontroller. Once one of the available boot modes has been selected, the software loads code from the appropriate device and stores it in the program RAM 402. When all software has been loaded, control is transferred to the start of program RAM 402.

It should be clear that a variety of processor implementations can be employed in association with the LAP 425 of the illustrative VSoC in order to provide an efficient balance of parallel processing and serial processing tasks. In an illustrative embodiment, the CPU/processor 501 and LAP 425 do not operate simultaneously, and rather, require one of the two to remain idle while the other executes a given instruction. The depicted CPU/processor 501 is only one possible implementation according to an illustrative embodiment. Processors based on differing (non-Harvard and/or non-RISC) architectures can be implemented in alternate embodiments with appropriate interconnections to the LAP, data memory and other associated components.

In addition to a SPI port arrangement, a parallel (FIFO) port is provided. This port is intended for communication with an off-chip host processor, microcontroller or other device, such as the second processor of the illustrative embodiment. The second processor receives processed data from the data memory 414 via the LAP 425, and performs a particular operation or set of operations on the received data in an effort to provide desired output values. This process is described in further detail below. Alternatively, the same pins can be used as a video port as shown, to output an image to another processor equipped with a video port. In an embodiment, a 512-word-wide host port can transfer a 1024 pixel row in approximately 25.5 uSecs, or approximately 51 images/second. Note that a separate, dedicated video port can also be provided along the bus.

A low-voltage differential signaling (LVDS) port is provided to transmit data serially at high speed over twisted pair lines. It uses a frame format composed of a start bit, ten data bits and a stop bit compatible with de-serializer ICs from a variety of commercial sources. In various embodiments, the LVDS port can be employed as an alternative to the host port for communication with the second processor. Additionally, a serial port in the form of a standard UART is provided and a general purpose input/output (GPIO) port is provided having, illustratively up to 16 GPIO lines, which are multiplexed with the pins of the other I/O ports along the bus. An IEEE standard joint test action group (JTAG) port can be used as debug port, allowing a direct connection to nearly all internal devices through processor 501 and internal configuration registers. With this channel it is also possible to access the main memory and the internal devices. Power management functions, a system clock generator, reset functions and a bus table ROM are also illustratively provided in the VSoC 200. In addition, the bus interconnects a statistics unit responsive to the processor 501. This unit illustratively calculates statistics during edge tracking operations. The statistics are stored in a set of I/O-mapped registers. Once the edge tracking is completed, the statistics can be used to determine the perimeter of the objects being tracked and the orthogonal and diagonal bounding boxes.

It should be clear that the above-described implementation of a VSoC is exemplary of a variety of possible processor implementations for use with the system and method according to illustrative embodiments. In alternate embodiments, the processor can be organized around a differing parallel architecture, with or without a separate control processor. Likewise, a processor or processors that is/are not highly parallel, and that possess appropriate speed and data-handling capabilities can be employed to perform the system and method of this invention. Thus, the term "VSoC" or "vision sensor" as use herein should be taken broadly to include a variety of processor architectures, including some in which certain operations described above are performed off-chip (off-die) by a separate component interconnected with other on-chip components.

For example, while the illustrative architecture herein includes the SIMD arrangement (LAP), memory, general purpose processor (CPU) and pixel array on a single chip/die, so as to define the VSoC architecture, it is expressly contemplated that (for example) the pixel array can reside off-chip/off-die and be operatively interconnected by appropriate leads. This may be desirable in certain implementations. For example, where the device form factor dictates certain geometries or where a pixel array that is separate from the processing assembly is desired.

III. Processing Based Upon Focus of Attention
A. System Overview

Figure 9:
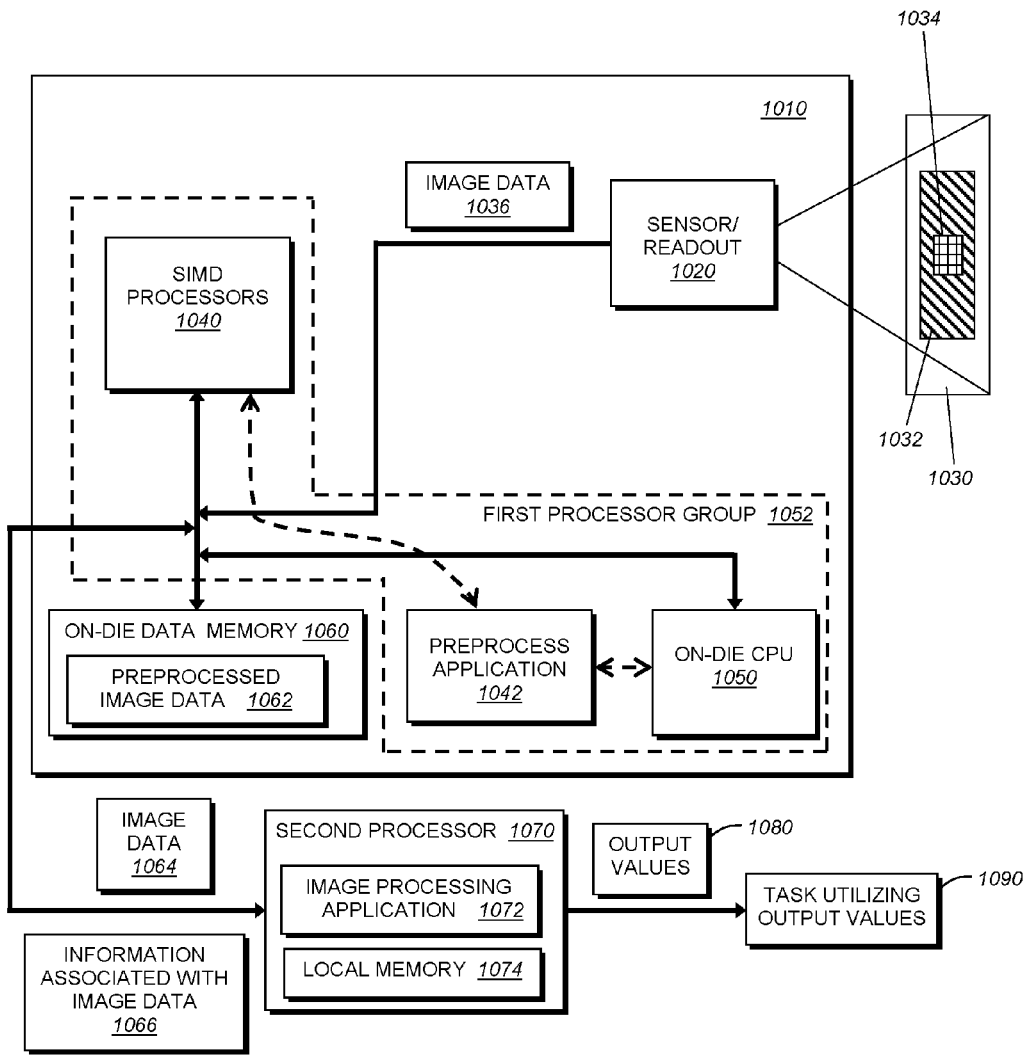
FIG. 9 is a block diagram showing the generalized image processing functions of a first processor group and a second processor within the system of FIG. 9.

The illustrative embodiments are first described with reference to the generalized arrangement of FIG. 9, which summarizes the functions within the above-described VSoC architecture for use in accordance with the illustrative system and method. Illustrative implementations are thereafter described. The on-die components and functions 1010 carried out in the VSoC are shown as a discrete box. The sensor and readout functions 1020 acquire sequential images of an exemplary object 1032 within a field of view (FOV) 1030. The object contains one or more regions of special interest 1034 in the vision system process. As will be described below, these regions are established as one or more focus(es) of attention for the vision system's processes. The sensor/readout functions 1020 provide unprocessed image data 1036 from the sequence of images to the array of SIMD processors 1040, which execute a preprocessing application 1042 in conjunction with the on-die, general purpose CPU 1050. The SIMD array and CPU collectively define an on-die "first processor group" 1052 as described herein. The type of preprocessing performed on the image data is highly variable in the various embodiments contemplated herein. In an illustrative embodiment, the preprocessing process generates a set of preprocessed image data 1062 that is stored in the on-die memory 1060 operatively connected to the SIMD array 1040. In an embodiment, described below, the preprocessed data illustratively comprises a reduced data set related to the region(s) of special interest. The preprocessed data can also include information related to the regions, such as pixel locations for noted features and other image data parameters. This reduced data set is significantly more compact that the overall image data, and more readily stored in the memory 1060.

As the image data 1036 is read-out, the first processor group 1052 typically performs "concurrent" or "simultaneous" (i.e. within the same processing cycle) preprocessing with readout. In various embodiments, the preprocessed data is, likewise, stored in the memory 1060, while at least a portion of the original image data (1036) (e.g. data related to the regions) 1064 is concurrently (on the same processing cycle) transmitted to the second processor or processor group 1070 to be stored in a local memory 1074. At an appropriate time, other additional and/or associated information 1066 can also be transmitted to the second processor, (after such information is created). The second processor can reside off-die as described above. As used herein, the term "second processor" shall refer to one or more processing mechanisms (for example, a "second processor group") that performs one or more image processing steps with respect to the image data. Various examples of second processors are described with respect to the illustrative embodiments below. In alternate embodiments, the second processor can be instantiated on-die, or partially on-die, with the other image-processing device components. In other illustrative embodiments, the image data 1064 and information 1066 transmitted to the second processor 1070 is characterized as a preprocessed image data set. As described below, this can be a reduced image (for example, an image with fewer pixels than the original image or an edge image), feature information, or other subsets and derivations of the original image data that are useful to the second processor 1070 in performing its predetermined function(s). Generally, the second processor's function executes an image processing application (using hardware and/or software) 1072 on the received data that generates output values 1080, which are employed in a task utilizing the output values 1090. As used herein, the term "output values" refers to information or data derived from an image that allows a user or a device to perform a task or make a decision. "Output values" are typically, but not limited to, numerical and textual information or other symbolic information that provide data on a symbol code, an part alignment orientation, and inspection result (defective/non-defective, in tolerance/out-of-tolerance, alarm, no-alarm, reject/accept, etc.). "Output values" are generally free of groupings of actual image pixel values in the form of partial images, compressed images, refined images, filtered images, etc., which still require further steps (e.g. review of the new image by a person or device) to obtain an actual decision or instruction to perform a task.

Data is transferred from the first processor group to the second processor using a variety of mechanisms and processes according to various embodiments, including, but not limited to, shift registers and direct memory access (DMA) arrangements. Such mechanisms and arrangements, and their associated processes (not shown) should be apparent to those of skill in the art.

Note that the SIMD architecture as described herein advantageously processes data using processors from the group that are assigned to discrete pixels from the overall readout. In an embodiment, the processors correspond to rows in the sensor array, but other organizations are contemplated. This is illustratively implemented as a bit-serial design. Alternatively, it is expressly contemplated that the principles herein can be implemented as a byte-serial design or another data-grouping-serial design. This arrangement contrasts generally with commonly employed block-level processing in which quadrants (2-D sectors) of the image are processed by a given processor at a given time. A description of various illustrative embodiments employing the above-described processor arrangement and associated functions is now provided in further detail.

Notably, the system and method of the illustrative embodiment provides a data memory 1060 associated with the first processor group 1052 that is smaller in capacity than the amount of image data to be read out from the sensor array 1020 in given image acquisition event. The data memory can be part of an overall memory architecture (typically residing on-die) that includes a separate program memory structure. Alternatively the data memory can be combined in a unified or unitary memory array with the program memory (and, optionally, other task-oriented memory structures). This data memory can comprise a random access memory (RAM) that is directly accessible by the first processor group, meaning that the processor group can address the data memory's storage locations through a relatively direct connectivity, rather than a bus-based architecture requiring serial transmission of portions of the stored data. Alternatively stated, the connectivity between the first processor group and the data memory renders memory access operations relatively inexpensive from a latency overhead standpoint.

B. Reduced Image Data Set

Figure 10:
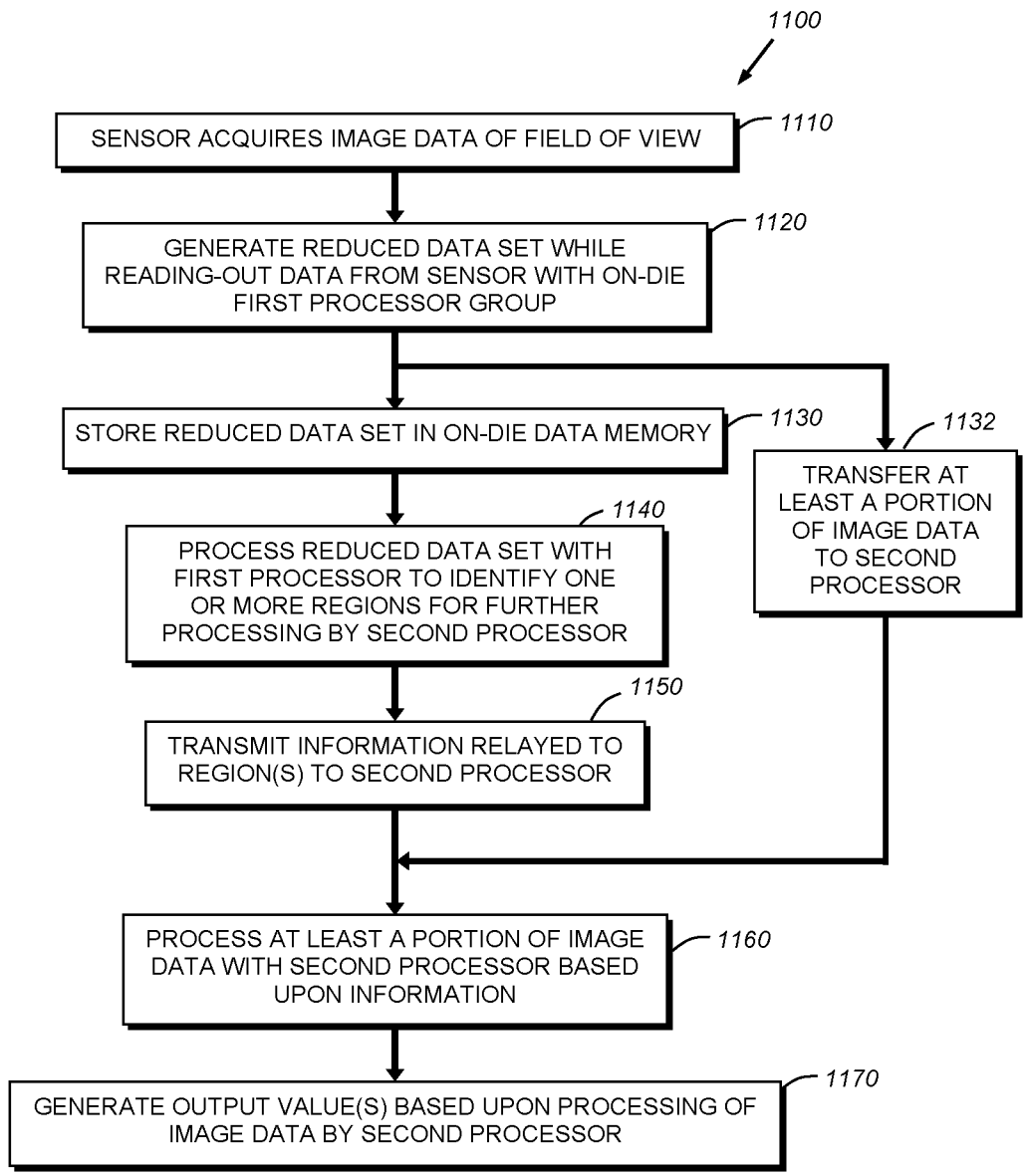
FIG. 10 is a flow diagram of an illustrative process for generating a reduced data set with respect to a read-out stream of image data using the first processor group and further processing at least some of the image data based upon the reduced data set with a second processor, in which the image data is concurrently transmitted to the second processor as the reduced data set is stored in the on-line data memory for processing by the first processor.

Reference is made to FIG. 10, which details a flow diagram for a process 1100 that generates a reduced image data set from the original image data, and processes the reduced data set to generate output values according to an illustrative embodiment. The process 1100 acquires each of a sequence of images of a field of view containing an object or surface that will be the basis of a task to be performed (step 1110). The task can be, for example, outputting a decoded barcode value from a detected barcode on the object. The first processor group (SIMD array and CPU) generates a reduced image data set in accordance with a predetermined preprocessing function (step 1120). For example, the preprocessing process can generate an edge image, which removes extraneous data from the surrounding field of view and non-edge features of the object. The first processor group operates concurrently (e.g. in the same processing cycle) while image data is read out from the sensor. The reduced image data is stored in the on-die data memory (step 1130). The amount of information stored for a reduced data set, such as an edge image, is typically significantly less than the amount of data in the entire image. This allows the reduced data set to fit within the data memory as runtime operations proceed. In this embodiment, at least a portion of the image data read out from the sensor can also be transmitted to the second processor (step 1132). In an embodiment, the second processor can receive the entire image data from the sensor. Alternatively, a portion of the data set is transmitted to the second processor. The determination of which portion is transferred can be controlled based upon the presence of features in the reduced data set (among other criteria). In step 1140, the reduced data set is further preprocessed with the first processor group to identify one or more regions requiring further processing by the second processor using an image analysis application/process residing on the second processor. For example, edge image features stored in data memory as the reduced data set can be analyzed for barcode-like features—for example, detecting edges located at a particular relative spacing and with a particular relative placement pattern. A predetermined region is defined around an area having the candidate features, and the location of the region is defined as a region identifier (ID). The ID can consist of pixel locations (region boundary points or other indicia) or similar information allowing the second processor to focus its processing attention on the identified region. This region information is transmitted to the second processor in step 1150. More generally, a "region indicator" or "region ID" can be any reduced data value or reduced data set that allows the second processor to perform an image processing function on a portion of the image data that is a subset of the overall read-out image data. Thus, this term should be taken broadly to include information related to image data subsets that are not, per se regions of an overall image.

In the process 1100, the region information received by the second processor in step 1150 is employed to perform the second processor's predetermined image analysis process in step 1160. In an illustrative embodiment, the second processor directs its image analysis processing task on the region(s) identified in the information, thus allowing it to work immediately on a smaller subset of the overall (or a portion of the overall) image data within its local memory. When a result is obtained from the second processor's predetermined process, it is provided as one or more output values in step 1170. In a barcode-decoding embodiment, the second processor provides a decoded barcode value (or a failure-to-read) as the output value(s).

Figure 11:
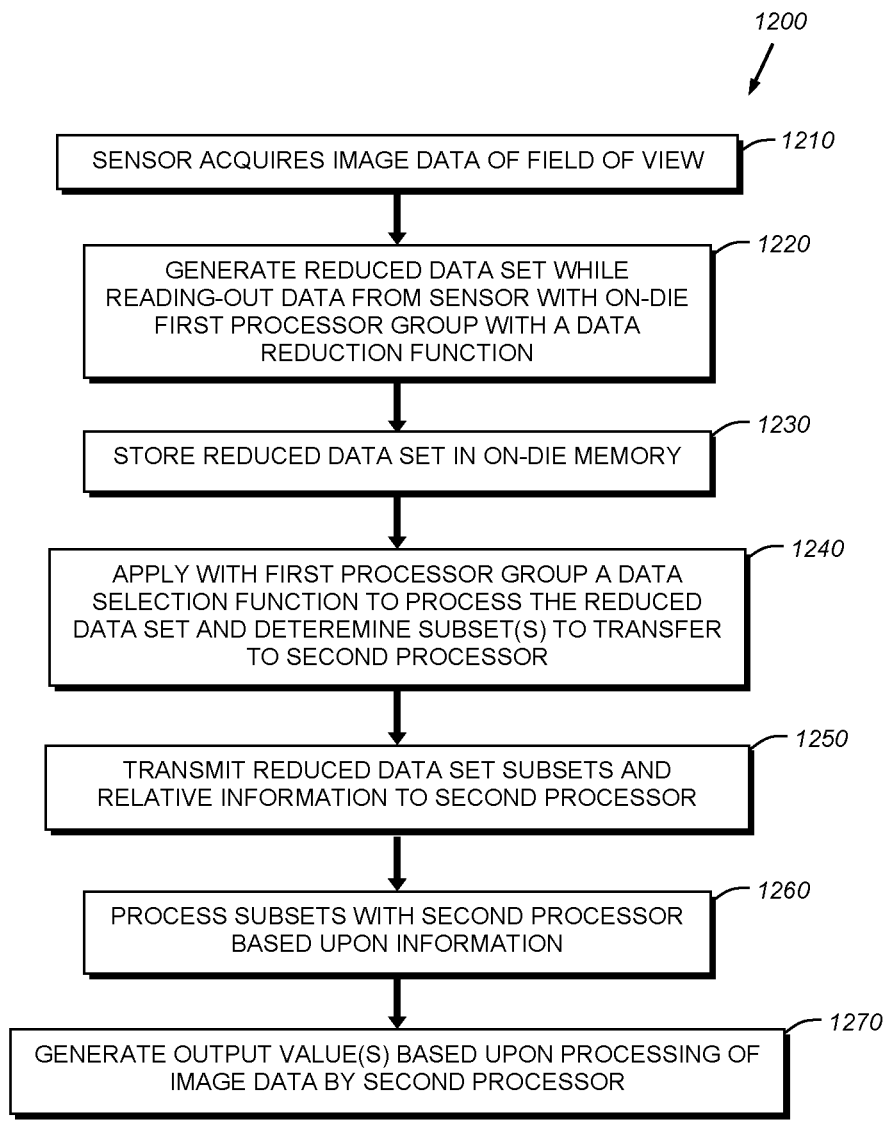
FIG. 11 is a flow diagram of an illustrative process for generating a reduced data set with respect to a read-out stream of image data using the first processor group and further processing at least some of the image data based upon the reduced data set with a second processor, in which the regions of image data are transmitted to the second processor as the reduced data set generated and regions are identified.

FIG. 11 shows a flow diagram for a process 1200 that generates a reduced image data set from the original image data, and processes the reduced data set to generate output values according to another illustrative embodiment. As described above, the sensor generates image data of the field of view containing an object or surface to be analyzed (step 1210). The first processor group generates a reduced data set, as described above while reading out the image data from the sensor in the same processing cycle (step 1220) using a data reduction function—for example, an edge-finding process or similar feature identification process. The reduced data set is stored concurrently in the on-die data memory (step 1230). The first processor group applies a data selection function as a further preprocessing task in step 1240. By way of example, a data selection function can be employed that determines and selects regions of data by (1) first finding similarly oriented neighboring edges, then (2) combining those edges into regions, and finally (3) selecting those regions that have desired characteristics, such as regions that fall within a certain aspect ratio range or exceed an edge density threshold. This generates subsets of data to transfer to the second processor. These subsets can define regions that contain features upon which the second processor should focus its processing activities. In one implementation, the subsets can include only reduced data (edge images, etc.). Alternatively, the subsets can include portions of the original un-reduced image data representing regions having features to be processed, along with information related to the regions. This information can include region location information and other relevant data, such as individual feature locations and characteristics.

The subsets of image data are then processed by the second processor according to a predetermined processing task in step 1260 and output values associated with the image are transmitted to a device or user that utilizes the output values to perform a task or make a decision.

C. Fixture/Alignment Processing

Figure 12:
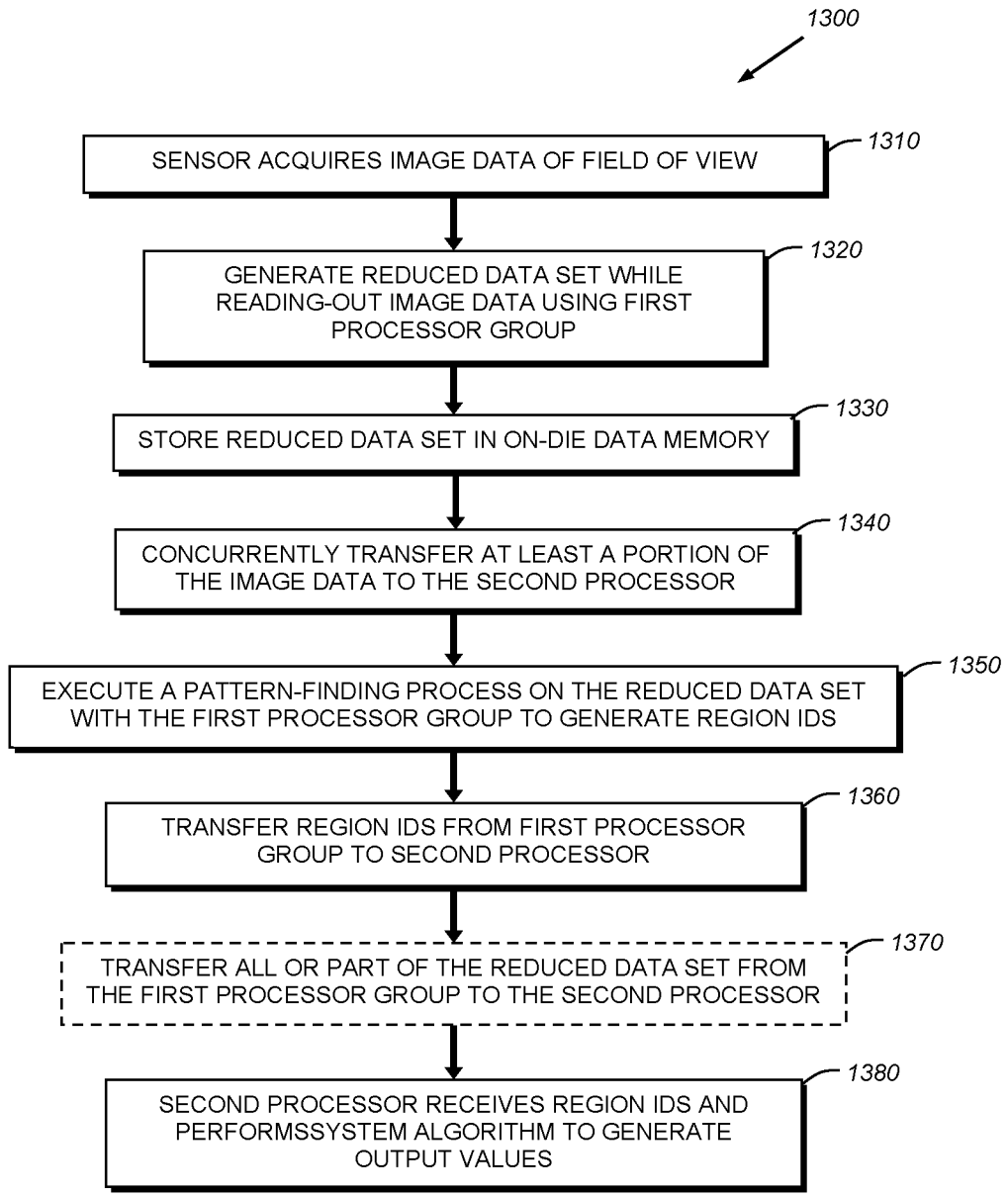
FIG. 12 is a flow diagram of a process for generating a reduced data set with respect to a read-out stream of image data for use in performing an alignment or fixture operation according to an illustrative embodiment.

With reference to FIG. 12, a process 1300 is shown for generating a reduced data set that is used in a fixture/alignment operation. By way of example, such an operation is used to determine the location of particular structures on an object, such as the placement of bolt holes to which a robot manipulator provides fasteners, or an electronic component pick and place operation on a circuit board. As the sensor acquires a sequence of images of the object or surface in step 1310, it reads out the image data to the first processor group. A reduced data set is generated by the first processor group while the image is read-out (step 1320). The reduced data set is stored in the on-die data memory once it is generated (step 1330). While reading-out the image data, at least a portion of the image data is transferred to the second processor. This occurs concurrently, within the same processing cycle as sensor readout (step 1340). In generating an initial reduced data set (step 1320), the first processor group can process the image data as it is received to provide, for example, an edge image. The edge image or other reduced data set is substantially smaller in size than the original read-out image data, and contains only features that may have significance in a subsequent pattern-finding process. The first processor group then executes a pattern-finding process (e.g. conventional blob analysis, geometric pattern-finding etc.) on the reduced data set to allow determination of what location(s) in the image has/have a predetermined pattern (step 1350). This result can be defined as a further "reduced data set" as it represents a data set that is reduced from the original image data. In this embodiment, the further reduced data set is the locations of regions in the image with identified features (Region IDs) that can be used in an alignment, gauging, measurement or fixture operation with respect to the imaged object or surface. The generated region IDs are stored in the on-die data memory and/or transferred from the first processor group to the second processor in step 1360. Any other useful preprocess information, such as all or part of the initial reduced data set (e.g. edge image) or additional Region ID information are optionally transferred from the first processor group to the second processor as shown by the dashed-line block (step 1370). As the image data and Region ID data are received by the second processor, it performs a vision system algorithm, which can include a conventional application for determination of size, rotation skew, etc. of the object/surface (step 1380). With knowledge of the pattern locations (focuses of attention), the second processor can omit operations on locations in the overall image not containing a region with a pattern used in the predetermined gauging, measurement and inspection operation. In step 1380, the second processor thus provides output values in the form of alignment or fixture parameters, such as position, size, rotation, skew, distance measurements, etc.

D. Coarse/Fine Alignment and Coarse/Fine Inspection Processing

Figure 13:
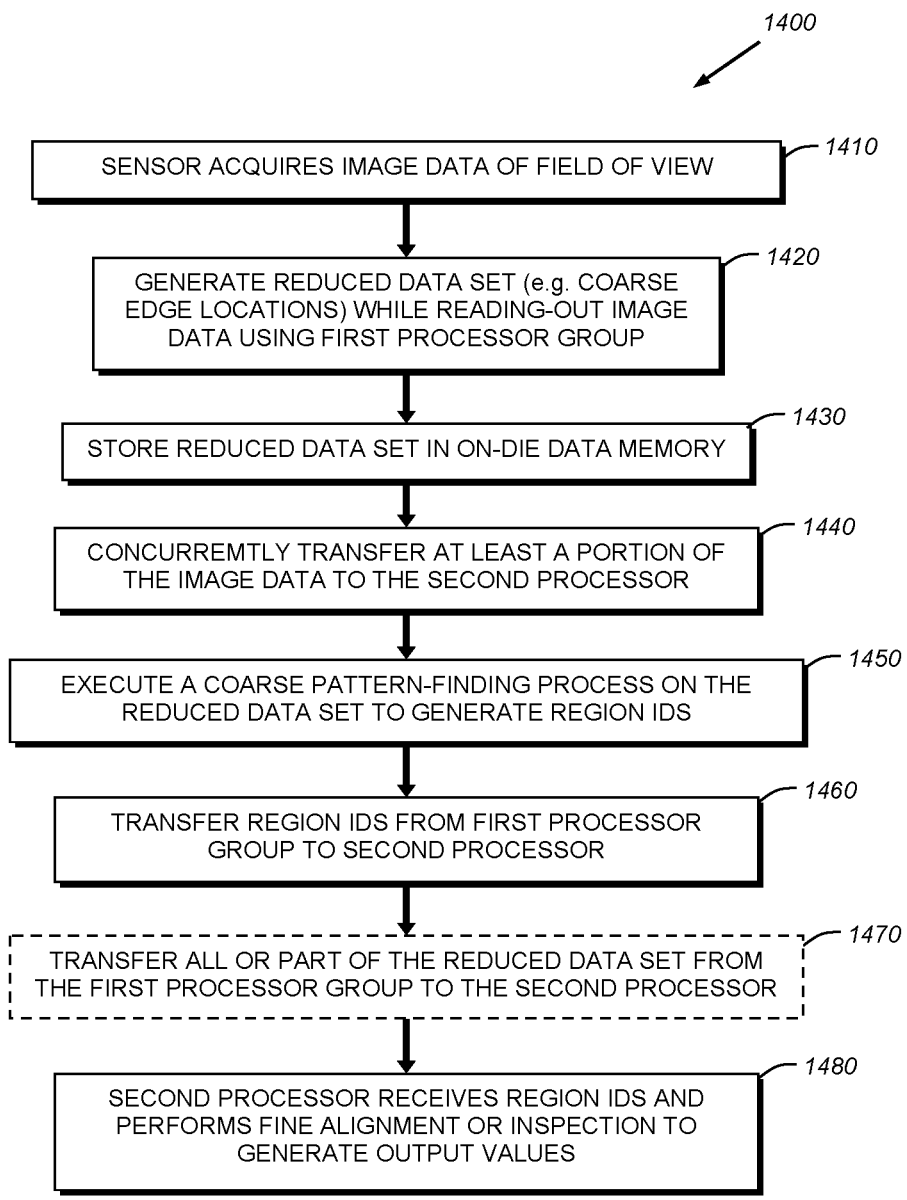
FIG. 13 is a flow diagram of a process for generating a reduced data set with respect to a read-out stream of image data for use in performing an alignment or inspection operation according to an illustrative embodiment.

With reference to FIG. 13, a process 1400 is shown for generating a reduced data set that is used in a coarse/fine alignment or a coarse/fine inspection operation. As the sensor acquires a sequence of images of the object or surface in step 1410, it reads out the image data to the first processor group. A reduced data set is generated by the first processor group while the image is read-out (step 1420). The reduced data set is stored in the on-die data memory once it is generated (step 1430). While reading-out the image data, at least a portion of the image data is transferred to the second processor. This occurs concurrently, within the same processing cycle as sensor readout (step 1440). In generating an initial reduced data set (step 1420), the first processor group can process the image data as it is received to provide, for example, the coarse edge locations. This reduced data set is substantially smaller in size than the original read-out image data, and contains only features that may have significance in a subsequent pattern-finding process. The first processor group then executes a pattern-finding process on the reduced data set to allow determination of what location(s) in the image has/have a predetermined pattern (step 1450). This result can be defined as a further "reduced data set" as it represents a data set that is reduced from the original image data. In this embodiment, the further reduced data set is the locations of regions in the image with identified features (Region IDs) that can be used in an alignment, gauging, measurement or fixture operation with respect to the imaged object or surface. The generated region IDs are stored in the on-die data memory and/or transferred from the first processor group to the second processor in step 1460. Any other useful preprocess information, such as all or part of the initial reduced data set (e.g. edge image) or additional Region ID information are optionally transferred from the first processor group to the second processor as shown by the dashed-line block (step 1470). In step 1480, the Region IDs, and any other information, is used by the second processor to generate output values in the form of fine alignment or fine inspection results, to be described in further detail below.

In a coarse/fine alignment embodiment, the region IDs and other useful preprocess information can provide a coarse estimate of object or feature alignment, such as coarse edge locations that can be obtained relatively rapidly using an edge-finding process that employs a coarse accuracy. For example, this coarse accuracy can be at approximately ½ pixel or greater, but a coarser or finer granularity is expressly contemplated. This saves processing time and data storage overhead normally associated with a single-step fine alignment process. As the image data and coarse edge locations are received by the second processor, it performs a fine alignment algorithm, which can include a conventional application for performing highly accurate 2D or 3D alignment (step 1440). This application can have an edge accuracy of $\frac{1}{40}^{th}$ of a pixel and $\frac{1}{10}^{th}$ a degree of rotation, or finer. Other accuracies are expressly contemplated depending upon the needs of the system. In general, the coarse alignment process is at least several times less accurate than the fine alignment process. Any conventional or customized application can be used to perform fine alignment. Notably, speed and efficiency of processing is increased significantly as the fine alignment application operates on relatively localized regions already identified as containing edges. Alignment is a processing-intensive application on a typical DSP arrangement. By focusing it on a small localized area, the fine alignment process occurs significantly more rapidly. Note that the first processor group can provide coarse alignment data (e.g. object or feature edge locations) that define a sufficient area (a few pixels of border around the edge, for example) around the found edge to ensure that the searched region in the fine alignment step actually locates the edge. The output values in an alignment embodiment are characterized as fine alignment data (e.g. edge locations or object locations), and can be defined with respect to multiple degrees of freedom (e.g. translation, rotation, skew, etc.).

In an embodiment that provides inspection results as output values, the region IDs and other useful preprocess information can include coarse inspection results (features and locations) typically based on a trained pattern of the object or surface. The inspection results can be features that are supposed to appear in the object or surface (bolt holes, labels, etc.) and/or features that are not supposed to appear (tears, cracks, etc.). In general, the first processor group can operate an inspection application, which can be conventional, and is set for coarse accuracy in performing an inspection operation. An exemplary inspection application capable of coarse inspection is PatQuick™, available from Cognex Corporation of Natick, Mass. As the image data and coarse inspection results are received by the second processor in step 1480, it performs a vision system algorithm, which can include a conventional inspection algorithm that provides accurate results. The algorithm can operate particularly on locations in the image data containing the locations of the coarse results. Because a less-precise inspection process is employed on the first processor group to quickly identify candidate results and generate appropriate region IDs and information, which can include various false-positive identifications, as well as actual features. The rapidity in which the first processor group can generate such results counterbalances the potential presence of false positives. When a false positive is uncovered by the fine process, it can be discarded, and the next coarse result, if any is then processed by the second processor. In the inspection embodiment, the second processor provides output values (step 1480) in the form of accurate inspection results for the object or surface. These inspection results can be a list of found features (e.g. three holes, one complete label, etc.) or can be a decision (e.g. part in/out-of tolerance, part good/defective, part accept/reject). Note that the results obtained in coarse and fine inspection can vary. In one implementation, the coarse inspection can generate accurate locations but uncertain features, or it can obtain less-accurate locations but more certain features. Likewise both the location and presences/absence of features can be of low-accuracy at the coarse stage. The fine inspection can generate more accurate locations and a more definitive presence/absence of features, or both.

E. Motion, Speed and Registration Determination

Figure 14:
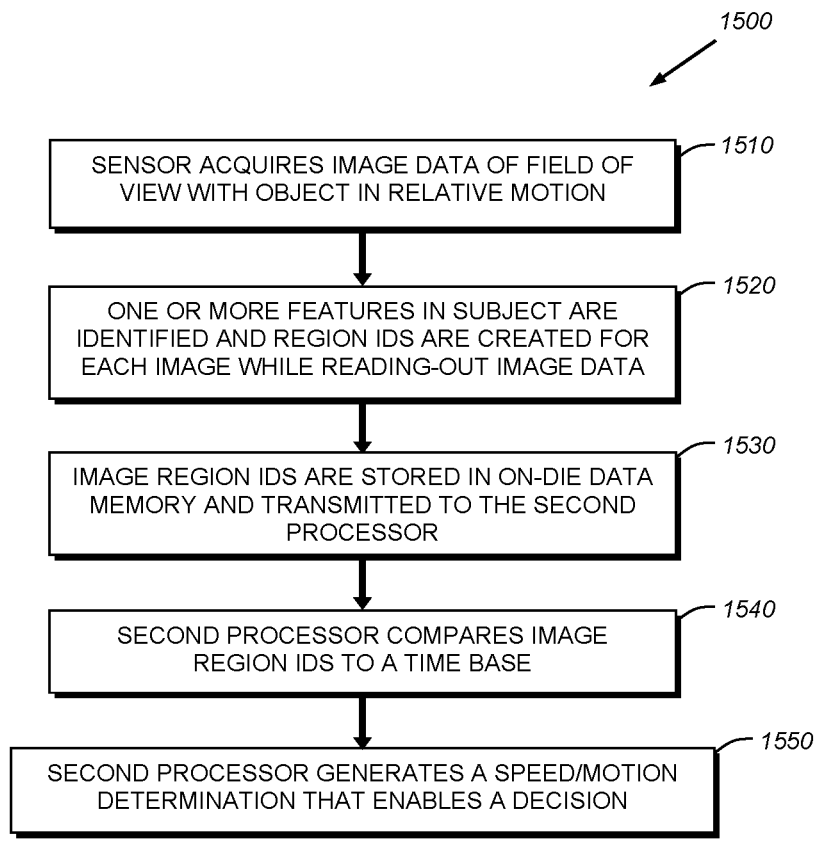
FIG. 14 is a flow diagram of a process for generating a reduced data set that is used to determine speed, motion and/or registration of a moving object or surface.

FIG. 14 shows a flow diagram for a process 1600 that generates a reduced image data set from the original image data, and processes the reduced data set to generate output values in the form of registration, speed or motion information for an imaged moving object or surface ("moving" being more generally defined as relative motion between the object or surface and the sensor's field of view) according to another illustrative embodiment. The sensor generates a sequence of images of the field of view containing an object or surface features that allow for a determination of motion (step 1510). The object can be a recognizable object, or portion of an object, which can be tracked between image frames, or a feature, such as a web registration mark or perforation that appears at a regular interval on the surface. More generally, any unique structure, fiducial or registration mark on the object or surface can be used in this embodiment to track registration. The first processor group receives the read-out image data for each acquired image frame, which may contain the object or feature. The image data is processed by the first processor group to generate a reduced data set (step 1520) using a data reduction function or process. In this embodiment, the process can be a pattern-recognition or feature-detection process (that can be conventional) that searches for one or more predetermined objects and/or features. Each identified feature or pattern in an image is provided with a location, and includes a time stamp. This data is stored in the on-die data memory as a region ID and/or other useful information (step 1530). These region IDs and the other useful information are transmitted to the second processor. As the identified feature moves from image-to-image, the time between images allows computation of the relative location of the feature(s) in each image. Thus, given a change in location and the time of the change in location, the second processor can compute the instantaneous speed of the object or surface, its relative motion and/or its registration with respect to other objects in the system (for example a print head or cutter) (step 1540). This computation is used to provide an output value in the form of an object or surface velocity, motion information and/or registration signal that can be used to make a decision on an event (step 1550). For example, the signal can be used to operate a cutter at a predetermined time, or to index a counter. Likewise, the signal can be used to speed up or slow down a moving conveyor belt. The decision can be made by the second processor, another processor or the first processor group.

F. Additional Memory for Storing Regions

Figure 15:
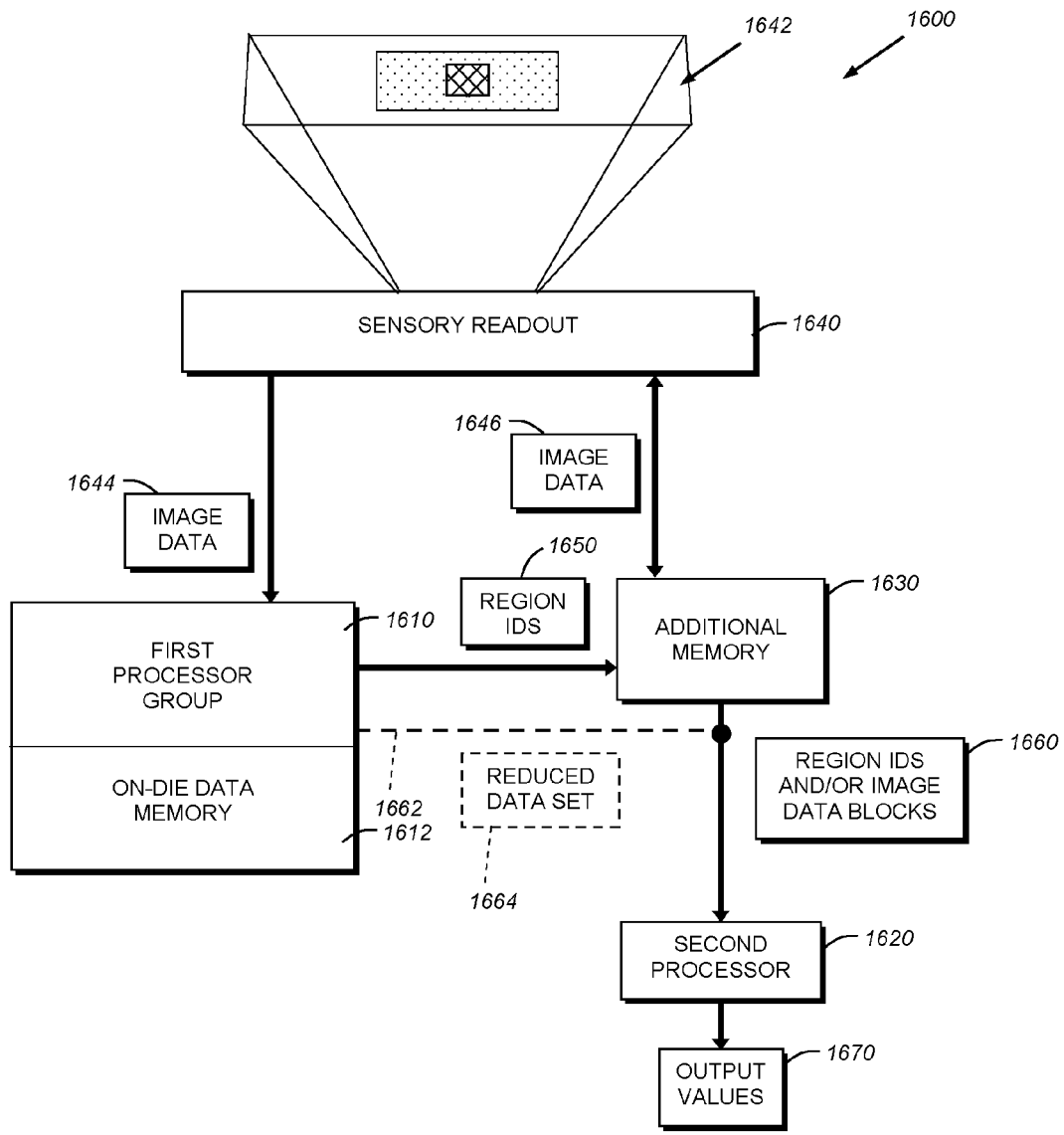
FIG. 15 is a block diagram of a first processor group with interconnected sensor and readout circuitry, a second processor, and an additional memory that stores the image data and transmits addressed regions or blocks to the second processor based upon the first processor.

In some implementations it is desirable to provide an additional memory that can be off-die, and is interconnected with the first processor group and the second processor. An arrangement 1600 is shown in FIG. 15, which includes a first processor group 1610 as described herein and a second processor 1620, as well as an additional memory 1630. As shown, the first processor group 1610 is interconnected to the sensor/readout circuitry 1640, which can be on-die or off-die with respect to the first processor group and its directly addressable data memory 1612. The sensor/readout 1640 transmits acquired image data 1644 from an imaged scene 1642 to the first processor group for preprocessing. As in other embodiments described herein, it is contemplated that the on-die directly addressable data memory 1612 is generally limited in capacity and cannot readily store the entire set of image data in a given acquired and fully read-out image frame. In operation, the first processor group generates a reduced data set, which is stored in on-die data memory. This reduced data set can be edge-images or any other reduced set of image data that is useful for focusing further image processes to parts of the image that contain particular features of interest. The image data 1646 is also concurrently transmitted to the additional memory 1630 in an embodiment from the sensor/readout 1640 if the memory is sufficiently large in capacity. In an alternate embodiment, the image data 1648 can be transferred to the memory 1630 via the first processor group (as it is read-out), rather than directly from the sensor/readout 1740. The first processor group executes a data selection function on the reduced data set so as to generate region IDs 1650. These can be stored in on-die memory. The Region IDs relate to locations of corresponding image data in the additional memory 1630. Such region IDs can relate to memory addresses for particular locations (i.e. blocks) of the additional memory 1630 that contain regions of interest based upon the reduced data set. The region ID(s), and/or image data (region blocks) corresponding to region ID(s) 1660, is/are transferred to the second processor 1620. This transfer can be directly from the additional memory or at least in part via the first processor group (as represented by dashed branch line 1662). All or part of the reduced data set 1664 can also be transferred to the second processor as part of the useful information used in its processing function. The second processor 1620 receives the region ID(s), image data and other useful data and thereby performs a desired vision system algorithm to generate desired output values 1670. A memory controller and/or other appropriate circuitry (not shown) can be provided to facilitate transfer of image data and other information into and from the additional memory 1630. The second processor can execute a variety of further processing functions. Such further processing functions can entail any of the functions described above, including, but not limited to, ID recognition, fixturing, alignment, inspection and registration.

It should be clear that a number of other vision system processes can benefit from the structure and function of the first processor group and the second processor and associated memories described above. Any process that allows for the creation of a reduced data set in image data by a first SIMD processor group, followed by a subsequent process with all or a portion of the image data using the reduced data set to direct the second processor's operation can be implemented in accordance with alternate embodiments.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the arrangement of specific processor components is highly variable within the general description of a first processor group, a second processor or second processor group and an on-die data memory. Also, while the first processor group contains an SIMD architecture as part of the overall processing arrangement, this term should be taken broadly to include other processing architectures that employ equivalent structures to perform equivalent functions on input image data. Likewise, it is expressly contemplated that a plurality of first processor groups can be used in a vision system arrangement, interconnected with one or more image sensors, which may or may not reside on-die with the associated first processor groups. This plurality of first processor groups can be interconnected with one or more second processors or second processor groups to generate the desired output values. Additionally, any of the operations described herein can be implemented as hardware, software, including computer readable medium containing program instructions or a combination of hardware and software. Accordingly, this description is meant to be taken only by way of example, and not to otherwise limit the scope of this invention.

The invention claimed is:

1. A vision system having an image sensor that produces image data relative to each of a sequence of acquired images comprising:
   a first processor group including a plurality of SIMD processors, at least one general purpose processor and a directly accessible data memory, each residing on a single die and operatively connected to the sensor so that the first processor group receives the image data read-out from the image sensor, wherein the data memory is smaller in capacity than a size of the image data relative to each of the sequence of acquired images, the first processor group being constructed and arranged to operate a data reduction process that generates a reduced data set with respect to each image data concurrently as the image data is read-out; and
   a second processor that receives at least a portion of the image data concurrently as the reduced data set is stored in the data memory, the second processor including an image analysis process that generates output values based upon information in the reduced data set.

2. The vision system as set forth in claim 1 wherein the reduced data set includes at least one region identifiers (ID) with respect to the at least a portion of the image data that allow the image analysis process to operate upon a location of at least a portion of the image data specified by the at least one region ID to generate the output values.

3. The vision system as set forth in claim 2 wherein the image analysis process comprises a barcode-decoding process.

4. The vision system as set forth in claim 1 wherein the reduced data set comprises feature information and the output values comprise at least one of inspection and alignment data.

5. The vision system as set forth in claim 1 wherein the sensor resides on the single die.

6. The vision system as set forth in claim 1 wherein the reduced data set includes at least one feature of a moving object or surface that changes location in each of a plurality of the images, each of the images having a timestamp, and the output values include at least one of motion, speed and registration information.

7. The vision system as set forth in claim 6 wherein the output values trigger an event.

8. The vision system as set forth in claim 1 wherein the reduced data set includes preprocessed image data that is smaller in size than the image data, and that provides at least one data element used by the image analysis process to generate the output values.

9. A vision system having an image sensor that produces image data relative to each of a sequence of acquired images comprising:
   a first processor group including a plurality of SIMD processors, at least one general purpose processor and a directly accessible data memory, each residing on a single die and operatively connected to the sensor so that the first processor group receives the image data read-out from the image sensor, wherein the data memory is smaller in capacity than a size of the image data relative to each of the sequence of acquired images, the first processor group being arranged to receive one or more images sequentially from the image sensor; and
   wherein the plurality of SIMD processors in the first processor group is constructed and arranged to employ a data reduction function on each received image to produce a reduced data set which is stored in the data memory.

10. The vision system as set forth in claim 9 further comprising a second processor that receives at least the reduced data set and generates output values based upon a vision system task carried out by the second processor with respect to the reduced data set.

11. The vision system as set forth in claim 10 wherein the second processor receives the image data concurrently as the image data is read-out from the image sensor, and the reduced data set directs the vision system task to be carried out on an identified subset of the image data received by the second processor.

12. A vision system having an image sensor that produces image data relative to each of a sequence of acquired images comprising:
   a first processor group including a plurality of SIMD processors, at least one general purpose processor and a directly accessible data memory, each residing on a single die and operatively connected to the sensor so that the first processor group receives the image data read-out from the image sensor, wherein the data memory is smaller in capacity than a size of the image data relative to each of the sequence of acquired images, the first processor group being arranged to receive one or more images sequentially from the image sensor;
   an additional memory that concurrently receives the image data read-out from the image sensor; and
   wherein the plurality of SIMD processors in the first processor group is constructed and arranged to employ a data reduction function on each received image to produce a reduced data set which is stored in the data memory, the reduced data set including identifiers for regions of the image data in stored the additional memory that are subject to further vision system processes.

13. The system as set forth in claim 12 further comprising a second processor that receives the regions of image data from the additional memory and generates output values based upon a vision system task carried out by the second processor with respect to the regions.

14. A method for processing image data with a vision system having an image sensor that produces image data relative to each of a sequence of acquired images comprising the steps of:
- receiving, by a first processor group including a plurality of SIMD processors, at least one general purpose processor and a directly accessible data memory, each residing on a single die, the image data read-out from the image sensor, the data memory being smaller in capacity than a size of the image data relative to each of the sequence of acquired images;
- generating, on the first processor group, a reduced data set with respect to each image data concurrently as the image data is read-out;
- receiving, by a second processor, at least a portion of the image data concurrently as the reduced data set is stored in the data memory; and
- generating, by the second processor, output values based upon information in the reduced data set.

15. The method as set forth in claim 14 wherein the reduced data set includes at least one region identifiers (ID) with respect to the at least a portion of the image data that allow the image analysis process to operate upon a location of at least a portion of the image data specified by the at least one region ID to generate the output values.

16. The method as set forth in claim 15 wherein the output values comprise decoded barcode data.

17. The method as set forth in claim 14 wherein the reduced data set comprises feature information and the output values comprise at least one of inspection and alignment data.

18. The method as set forth in claim 14 wherein the sensor resides on the single die.

19. The method as set forth in claim 14 wherein the reduced data set includes at least one feature of a moving object or surface that changes location in each of a plurality of the images, each of the images having a timestamp, and the output values include at least one of motion, speed and registration information.

20. The method as set forth in claim 14 wherein the output values trigger an event.

21. The method as set forth in claim 14 wherein the reduced data set includes preprocessed image data that is smaller in size than the image data, and that provides at least one data element used by the image analysis process to generate the output values.

* * * * *